(12) United States Patent
Spitzer

(10) Patent No.: US 9,256,071 B1
(45) Date of Patent: Feb. 9, 2016

(54) USER INTERFACE

(75) Inventor: Mark B. Spitzer, Sharon, MA (US)

(73) Assignee: Google Inc., Mountain View, CA (US)

( * ) Notice: Subject to any disclaimer, the term of this patent is extended or adjusted under 35 U.S.C. 154(b) by 1000 days.

(21) Appl. No.: 13/346,352

(22) Filed: Jan. 9, 2012

(51) Int. Cl.
| | |
|---|---|
| H04N 7/18 | (2006.01) |
| G02B 27/01 | (2006.01) |
| H04N 13/04 | (2006.01) |
| G02B 27/00 | (2006.01) |

(52) U.S. Cl.
CPC .......... G02B 27/017 (2013.01); G02B 27/0093 (2013.01); H04N 7/181 (2013.01); H04N 13/04 (2013.01); H04N 13/0468 (2013.01); H04N 13/0484 (2013.01); G02B 2027/014 (2013.01); G02B 2027/0178 (2013.01); G02B 2027/0187 (2013.01)

(58) Field of Classification Search
USPC ............................ 348/42–60, 148–160; 345/8
See application file for complete search history.

(56) References Cited

U.S. PATENT DOCUMENTS

| | | | |
|---|---|---|---|
| 6,091,546 A | 7/2000 | Spitzer | |
| 7,192,136 B2 | 3/2007 | Howell et al. | |
| 7,255,437 B2 | 8/2007 | Howell et al. | |
| 7,380,936 B2 | 6/2008 | Howell et al. | |
| 7,401,918 B2 | 7/2008 | Howell et al. | |
| 7,438,410 B1 | 10/2008 | Howell et al. | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,677,723 B2 | 3/2010 | Howell et al. | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,809,160 B2 | 10/2010 | Vertegaal et al. | |
| 7,889,244 B2 | 2/2011 | Tsukizawa et al. | |
| 7,922,321 B2 | 4/2011 | Howell et al. | |
| 8,109,629 B2 | 2/2012 | Howell et al. | |
| 2002/0144259 A1* | 10/2002 | Gutta et al. | ..................... 725/10 |
| 2003/0020755 A1* | 1/2003 | Lemelson et al. | ............. 345/786 |
| 2006/0082542 A1* | 4/2006 | Morita et al. | ................. 345/156 |
| 2006/0093998 A1 | 5/2006 | Vertegaal | |
| 2006/0241792 A1* | 10/2006 | Pretlove et al. | ................. 700/83 |
| 2009/0051761 A1* | 2/2009 | Atarashi | ......................... 348/54 |
| 2009/0146779 A1* | 6/2009 | Kumar et al. | ................ 340/5.31 |

(Continued)

FOREIGN PATENT DOCUMENTS

WO 2011115047 A1 9/2011

*Primary Examiner* — Gelek W Topgyal
(74) *Attorney, Agent, or Firm* — McDonnell Boehnen Hulbert & Berghoff LLP

(57) ABSTRACT

Methods and apparatus for controlling one or more devices using a computing device, such as a wearable computing device, are disclosed. Using a sensor associated with a wearable computing device, one or more inputs are generated at the wearable computing device. As one example, the sensor can be an image capture device, and the inputs can be one or more images from a point of view of a person associated with the computing device. As another example, the sensor can be a motion sensor, and the input can be locations and/or orientations, and a gaze direction can be determined. The computing device can determine an object of interest based on the inputs. A control signal can be generated for the object of interest. The control signal can be transmitted from the computing device.

30 Claims, 14 Drawing Sheets

(56) References Cited

U.S. PATENT DOCUMENTS

| | | | |
|---|---|---|---|
| 2010/0053440 A1* | 3/2010 | Mortensen | 348/569 |
| 2010/0079508 A1 | 4/2010 | Hodge et al. | |
| 2010/0110368 A1* | 5/2010 | Chaum | 351/158 |
| 2010/0205667 A1 | 8/2010 | Anderson et al. | |
| 2010/0250985 A1* | 9/2010 | Gupta | 713/323 |
| 2012/0206323 A1* | 8/2012 | Osterhout et al. | 345/8 |
| 2012/0212398 A1* | 8/2012 | Border et al. | 345/8 |
| 2012/0300061 A1* | 11/2012 | Osman et al. | 348/135 |
| 2013/0002813 A1* | 1/2013 | Vaught et al. | 348/43 |
| 2013/0010089 A1* | 1/2013 | Maeda et al. | 348/53 |
| 2013/0021373 A1* | 1/2013 | Vaught et al. | 345/633 |
| 2013/0050451 A1* | 2/2013 | Shintani | 348/56 |
| 2013/0328927 A1* | 12/2013 | Mount et al. | 345/633 |
| 2014/0184588 A1* | 7/2014 | Cheng et al. | 345/419 |

* cited by examiner

USER INTERFACE

BACKGROUND

Unless otherwise indicated herein, the materials described in this section are not prior art to the claims in this application and are not admitted to be prior art by inclusion in this section.

Devices used at home and in the office are often designed to be controlled by other devices. A common example is a television (TV) set which is often designed to be controlled using a remote-control device. In operation, the remote control device typically has a number of buttons, and receives instructions from a viewer of the TV set via button presses. In response to the instructions, the remote control device sends commands to the TV set. Example commands include commands to change a TV station, alter sound volume, and turn on/off the TV set.

SUMMARY

In a first aspect, a method is provided. A plurality of images is generated using an image capture device associated with a wearable computing device. The images are from a point of view of a wearer of the wearable computing device. An object of interest is determined based on the plurality of images using the wearable computing device. A control signal for the object of interest is generated using the wearable computing device.

In a second aspect, a method is provided. A gaze direction is determined using at least one motion sensor associated with a wearable computing device. An object of interest is determined based on the gaze direction using the wearable computing device. A control signal for the object of interest is generated using the wearable computing device.

In a third aspect, a wearable computing device is provided. The wearable computing device includes (a) an image capture device, (b) a processor, and (c) memory. The memory has instructions that, in response to execution by the processor, cause the wearable computing device to perform functions. The functions include: (i) generating a plurality of images from a point of view of a wearer of the wearable computing device, (ii) determining an object of interest based on the plurality of images, and (iii) generating a control signal for the object of interest.

In a fourth aspect, an article of manufacture is provided. The article of manufacture includes a computer-readable storage medium having instructions stored thereon that, in response to execution by a processor, cause the processor to perform functions. The instructions include: (i) instructions for generating a plurality of images from a point of view of a wearer of the wearable computing device, (ii) instructions for determining an object of interest based on the plurality of images, and (iii) instructions for generating a control signal for the object of interest.

DETAILED DESCRIPTION

Overview

Figure 1:
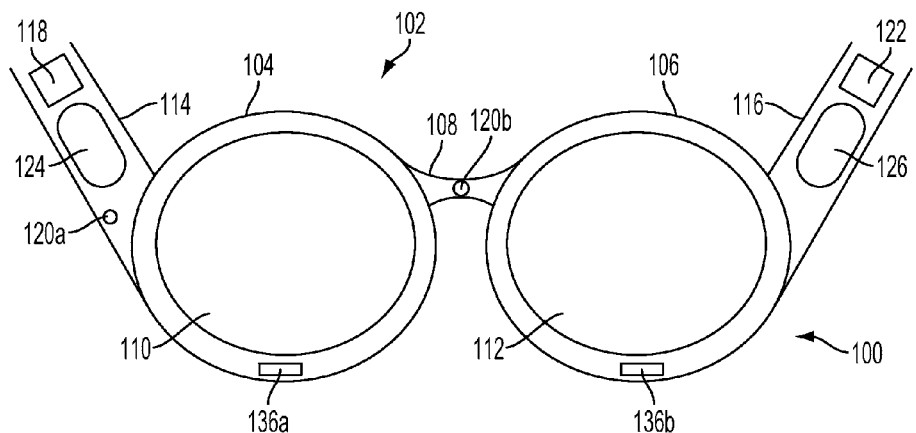
FIG. 1 is a first view of an example system for receiving, transmitting and displaying data, in accordance with an embodiment.

Methods and apparatus are described herein for controlling external devices using a computing device, such as a wearable computing device having a head-mounted display (HMD) and a side-mounted touchpad interface, or possibly a different type of wearable computing device. For example, suppose a wearer of a wearable computing device is watching pre-recorded content, such as a movie stored on a Blu-Ray disc or digital video disc (DVD). While the wearer is looking at an external display showing the movie, the Blu-Ray or DVD player plays the movie. However, when the wearer looks away from the external display, the wearable computing device determines that the wearer has looked away and correspondingly sends a command to the Blu-Ray or DVD player to pause the movie. When the wearer looks at the external display again, the wearable computing device determines that the wearer has resumed looking at the external display and correspondingly sends a command to the Blu-Ray or DVD player to continue playing the movie.

One approach for determining when the wearer is viewing an external display is to use image processing techniques on image(s) generated using a point-of-view (POV) video feed to detect the external display. Using these image processing techniques, the wearable computing device can determine when a user looks away by not detecting the external display in image(s) of the POV video feed. For example, when no portion of the external display is detected in the POV video feed, the wearable computing device can conclude that the wearer has looked away from the external display and can responsively send a command to the Blu-Ray or DVD player to pause the movie. Similarly, when a portion of the external display is recognized in the POV video feed, the wearable computing device can conclude that the wearer is looking at the external display, and responsively send a resume (not paused) command to the Blu-Ray or DVD player.

The wearable computing device can set a pause-threshold period for which the user must look away, before the wearable computing device causes the movie to be paused. In a related aspect, the wearable computing device may set a restart-threshold period for which the user must look at the device, before the wearable computing device causes the movie to be restarted after being paused. The thresholds can be used to permit the wearer to look away or look toward the movie for a brief interval before stopping or resuming the movie. Further, to compensate for a delay in stopping, the movie can be backed up to the point when the wearer first looked away from the movie, so that upon restart the movie resumes at the point at which the wearer first looked away.

In some scenarios, the wearable computing device can determine when a user looks away from the external display based on data from motion sensors such as a compass, gyroscope(s), and/or accelerometer(s). The motion sensor data can be processed in combination with or instead of the above-mentioned images of the POV video feed.

A number of different control signals can be generated. For example, as indicated above, pause and resume commands can be transmitted, respectively, in response to looking at or away from an external display. Gestures, such as quickly moving one's head to the left or right, can lead to generation of respective rewind and fast forward signals. Another example set of gestures could be looking up or down to increase or decrease, respectively, sound volume associated with the external display. Other possible gestures can be used as well.

Control signals can be generated based on the location of the wearer. For example, in an environment with loudspeakers or lights in multiple rooms of a building, the loudspeakers or lights can be turned off in a room that the wearer has left and can be turned on in a room that the wearer has entered.

The wearable computing device can be configured with a "control interface", such as an infrared (IR) diode, Bluetooth transceiver, Zigbee transceiver, Wi-Fi transceiver, and/or similar device(s) configured to emit control signals. The integration of remote control functionality into the wearable computing device via the control interface can permit the wearable computing device to control external devices, such as but not limited to: home entertainment equipment, home lighting, security equipment, and/or other remotely-controllable equipment. In some embodiments, the control interface can include a "control-signal receiver" to receive control signals and/or other information from an external device or controller. The received control signals and/or other information can permit remote control of the wearable computing device from an external device.

System and Device Architecture

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used.

As illustrated in FIG. 1, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed. Each of the lens elements 110 and 112 may also be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and can be positioned behind a user's ears to secure the eyeglasses 102 to the user. The extending side-arms 114 and 116 may further secure the eyeglasses 102 to the user by extending around a rear portion of the user's head. Additionally or alternatively, the system 100 may be connected to or be integral to a head-mounted helmet structure. Other possibilities exist as well.

The system 100 may also include an on-board computing system 118, video cameras 120a, 120b, a sensor 122, finger-operable touch pads 124, 126, and command interfaces 136a, 136b. The on-board computing system 118 is shown to be positioned on the extending side-arm 114 of the eyeglasses 102; however, the on-board computing system 118 may be provided on other parts of the eyeglasses 102. The on-board computing system 118 may include a processor and memory, for example. The on-board computing system 118 may be configured to receive and analyze data from sensor 118, video cameras 120a, 120b and finger-operable touch pads 124, 126 (and possibly from other sensory devices, user interfaces, or both) and generate images for output to the lens elements 110 and 112. In some embodiments, touch pads 124 and/or 126 can be configured to process handwriting inputs.

Video camera 120a is shown to be positioned on the extending side-arm 114 of the eyeglasses 102 and video camera 120b is positioned on center frame support 108; however, video cameras 120a, 120b may be provided on other parts of the eyeglasses 102. In some embodiments, video camera 120b can perform the functions of a "field of view" camera and capture images that correspond to the field of view of a wearer of system 100. Video cameras 120a, 120b may be configured to capture images at various resolutions or at different frame rates. Many video cameras with a small form-factor, such as those used in cell phones or webcams, for example, may be incorporated into an example of the system 100.

Although FIG. 1 illustrates two video cameras 120a, 120b; more or fewer video cameras may be used, and each may be configured to capture the same view, or to capture different views. The sensor 122 is shown mounted on the extending side-arm 116 of the eyeglasses 102; however, the sensor 122 may be provided on other parts of the eyeglasses 102. The sensor 122 may include one or more motion sensors, such as a gyroscope and/or an accelerometer. Other sensing devices may be included within the sensor 122 and other sensing functions may be performed by the sensor 122. The forward facing images captured by video camera 120b can be used to identify objects in the field of view and/or generate an augmented reality where computer generated images appear to interact with the real-world view perceived by the user.

The finger-operable touch pads 124, 126 are shown mounted on the extending side-arms 114, 116 of the eyeglasses 102. Each of finger-operable touch pads 124, 126 may be used by a user to input commands. The finger-operable touch pads 124, 126 may sense at least one of a position and a movement of a finger via capacitive sensing, resistance sensing, or a surface acoustic wave process, among other possibilities. The finger-operable touch pads 124, 126 may be capable of sensing finger movement in a direction parallel to the pad surface, in a direction normal to the pad surface, or both, and may also be capable of sensing a level of pressure applied. The finger-operable touch pads 124, 126 may be formed of one or more translucent or transparent insulating layers and one or more translucent or transparent conducting layers. Edges of the finger-operable touch pads 124, 126 may be formed to have a raised, indented, or roughened surface, so as to provide tactile feedback to a user when the user's finger reaches the edge of the finger-operable touch pads 124, 126. Each of the finger-operable touch pads 124, 126 may be operated independently, and may provide a different function.

Command interfaces 136a, 136b are configured to send and/or receive commands and/or data; for example, over short distances. In an example implementation, command interfaces 136a and/or 136b can be configured to send infrared signals. Thus, command interfaces 136a and/or 136b can emulate one or more functions of a remote control unit. The infrared signals may be received by any device configured to receive such signals; e.g. external displays, home electronic equipment, cameras, stereos, etc. In other embodiments, command interfaces 136a and/or 136b can be configured to send other signals instead of or along with infrared signals, such as but not limited to, Bluetooth signals, Zigbee signals, and/or Wi-Fi signals.

In some embodiments, command interfaces 136a, 136b can also receive infrared signals, decode the received signals as needed, and cause system 100 to act in accord with the received signals. For example, the received signals can be commands to control system 100 remotely. In some scenarios, the received signals are decoded before being determined to be commands that can be used to control system 100. In other embodiments, command interfaces 136a, 136b send but do not receive signals. In still other embodiments, command interfaces 136a and/or 136b can be configured to receive other signals instead of or along with infrared signals, such as but not limited to, Bluetooth signals, Zigbee signals, and/or Wi-Fi signals.

Figure 2:
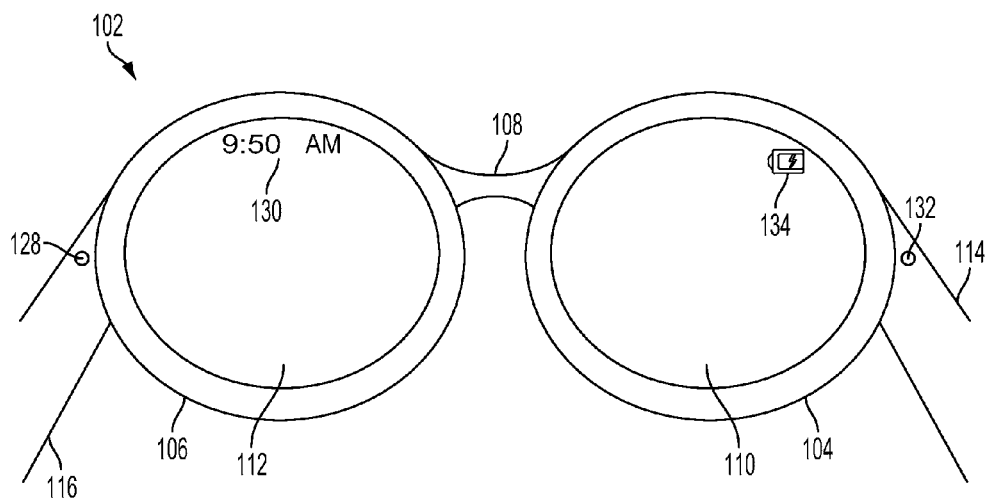
FIG. 2 is a second view of the example system of FIG. 1, in accordance with an embodiment.

FIG. 2 illustrates another view of the system 100 of FIG. 1. As shown in FIG. 2, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110 and 112 may act as a combiner in a light projection system and may include a coating that reflects the light projected onto them from the projectors 128 and 132. In some embodiments, a special coating may be omitted (e.g., when the projectors 128 and 132 are scanning laser devices that are sufficiently bright that adequate reflectance is obtained without a coating).

In alternative embodiments, other types of display elements may also be used. For example, the lens elements 110, 112 themselves may include: a transparent or semi-transparent matrix display, such as an electroluminescent display or a liquid crystal display; one or more waveguides for delivering an image to the user's eyes; and/or other optical elements capable of displaying an in-focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

In other embodiments (not shown in FIGS. 1 and 2), system 100 can be configured for audio output. For example, system 100 can be equipped with speaker(s), earphone(s), and/or earphone jack(s). In these embodiments, audio output can be provided via the speaker(s), earphone(s), and/or earphone jack(s). Other possibilities exist as well.

Figure 3:
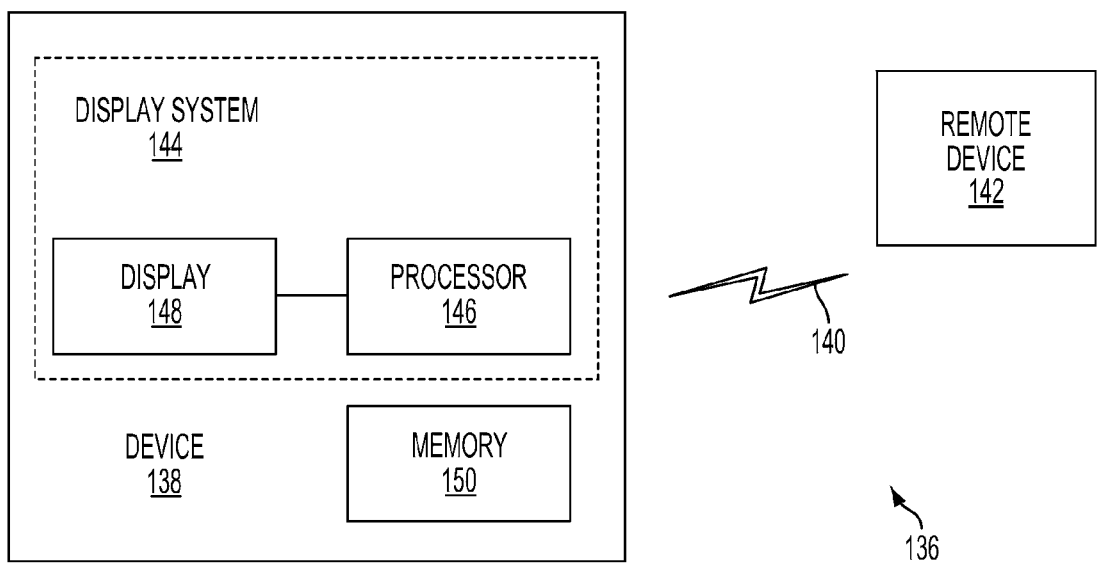
FIG. 3 is an example schematic drawing of computer network infrastructure, in accordance with an embodiment.

FIG. 3 is a schematic drawing of a system 136 illustrating an example computer network infrastructure. In system 136, a device 138 communicates using a communication link 140 (e.g., a wired or wireless connection) to a remote device 142. The device 138 may be any type of device that can receive data and display information corresponding to or associated with the data. For example, the device 138 may function as a head-mounted display system, such as the eyeglasses 102 described with reference to FIGS. 1 and 2.

Thus, the device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a microprocessor or a digital signal processor, for example.

The device 138 may further include on-board data storage, such as memory 150 shown coupled to the processor 146 in FIG. 3. The memory 150 may store software and/or data that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In some embodiments, device 138 is configured with command interface(s) 136a and/or 136b, and the remote device 142 is configured to receive commands sent from command interfaces(s) 136a, 136b and perform actions in accord with the sent commands. In particular embodiments, device 138 is configured to receive commands and/or other information via command interface(s) 136a, 136b and perform actions in accord with the received commands and/or other information.

In FIG. 3, the communication link 140 is illustrated as a wireless connection. The wireless connection could use, e.g., Bluetooth® radio technology, communication protocols described in IEEE 802.11 (including any IEEE 802.11 revisions), Cellular technology (such as GSM, CDMA, UMTS, EV-DO, WiMAX, or LTE), infrared or any other type of remote-control technology, or Zigbee® technology, among other possibilities. Alternatively or additionally, wired connections may be used. For example, the communication link 140 may be a wired link via a serial bus such as a universal serial bus or a parallel bus. A wired connection may be a proprietary connection as well. The remote device 142 may be accessible via the Internet and may comprise a computing cluster associated with a particular web service (e.g., social-networking, photo sharing, address book, etc.).

Example Wearable Computing System

Figure 4A:
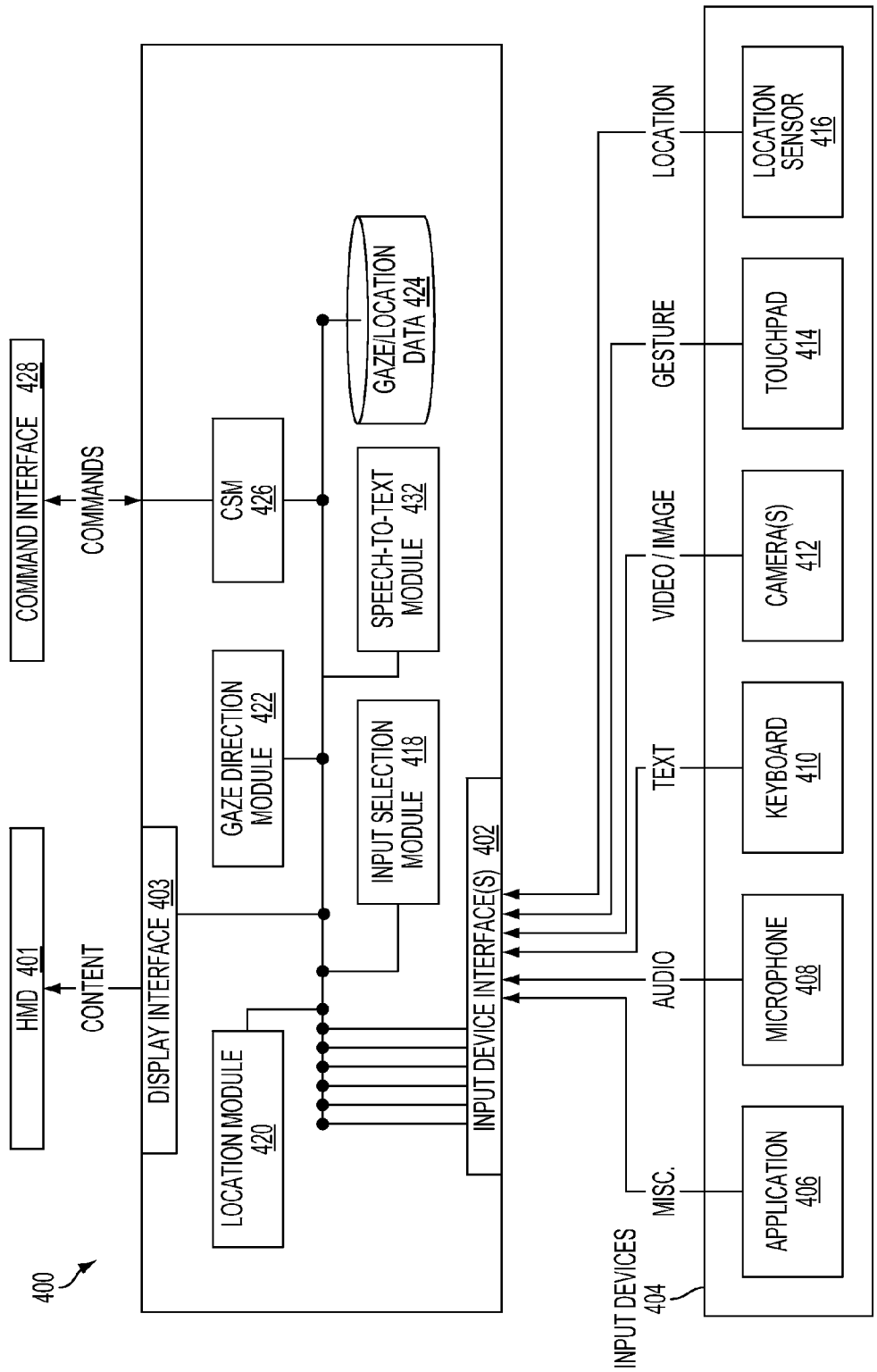
FIG. 4A is a functional block diagram for a wearable computing system, in accordance with an embodiment.

FIG. 4A is a functional block diagram for a wearable computing system 400 in accordance with an example embodiment. An example of system 400 is system 100 discussed above. System 400 is configured to monitor incoming data from a number of input devices 404 and display information related to the incoming data on Head Mounted Display (HMD) 401. For example, system 400 can monitor speech received via microphone 408 and, may convert the speech to text using speech-to-text module 432. The input speech can include commands that specify actions and objects for the actions. Accordingly, system 400 can be configured to detect commands, and to responsively initiate the actions specified in the commands. Similarly, commands can be received at command interface (CI) 428, passed to command selection module (CSM) 426, which can responsively initiate the actions specified in the commands. As another example, system 400 can receive images via camera(s) 412 and display some or all of the received images on HMD 401. Some or all of camera(s) 412 can be field-of-view (FOV) cameras configured to show captured images in a field-of-view of a wearer of system 400; e.g., captured images as seen by the wearer of system 400.

Example Input Devices

As shown in FIG. 4A, system 400 includes one or more input-device interfaces 402 for receiving data from input devices 404 and one or more output devices, such as HMD 401 and command interface 428, for presenting information related to the data from input devices. In the illustrated embodiment, the input devices 404 include, for example, an application 406, a microphone 408, a keyboard 410, camera(s) 412, a touchpad 414, and a location sensor 416. A given input-device interface 402 may be configured to interface with and receive data from a single input device, such as microphone 408. Alternatively, a given input-device interface 402 may be configured to simultaneously interface with multiple input devices, such as some or all of input devices 406-416.

System 400 can receive a number of different types of input data from input devices 404. In the illustrated embodiment, system 400 may receive, for example, audio data from microphone 408, text data from keyboard 410, video data and/or image data from camera(s) 412, and/or gesture data from touchpad 414. In some scenarios, multiple inputs can be received simultaneously. A system may be configured to receive other modalities of data, in addition or in the alternative to those described, without departing from the scope of the invention.

In some embodiments, some or all types of input data can be converted to text. For some types of input data, such as input data from keyboard 410 and touchpad 414, no conversion may be needed. For other types of input, conversion modules, such as speech-to-text module 432 and/or a video-to-text module (not shown in FIG. 4A), can be used to convert input data to text. Applications, such as application 406, may generate text, audio input, video input, and/or other types of input (e.g., encrypted input, compressed input, other types of binary input, etc.). Thus, application-specific techniques can be used generate input text from inputs derived from application 406.

Location sensor 416 can utilize one or more technologies and sensors to determine and provide a location of system 400. Example technologies include, but are not limited to, Global Positioning System (GPS) technologies and sensors, other satellite-based technologies and sensors, inertial navigation technologies, timing circuitry, accelerometers, compasses, velocity sensors, and gyroscopes. In some embodiments, location sensor 416 can determine and provide related information to system 400, such as velocity including both speed and direction(s) of travel, acceleration, distance(s) traveled, and timing information. Many other types of related information are possible as well.

Other input devices not shown in FIG. 4A can be utilized as well. For example, sensors, scanners, pads configured for touch and/or handwriting input, optical character recognition (OCR) related devices such as scanners, and various other devices can be used as input sources to system 400. In some embodiments, system 400 can be configured with one or more input and/or output ports or jacks configured for communicating with input and/or output devices.

Selection Criteria for Input Content

In the illustrated embodiment, system 400 includes an input selection module 418, which generally functions to evaluate the input data from the various input devices 404. In particular, input selection module 418 may be configured to receive input data from the input devices 404 via input device interfaces 402 and detect one or more data patterns in the input data.

In some cases, input selection module 418 may detect multiple concurrent data patterns in the input data. For example, input selection module 418 may detect a first data pattern in data from a first source and, simultaneously, detect a second data pattern in data from a second source. As such, selection criteria in input selection module 418 may provide input-selection rules that prioritize certain data patterns and/or certain input devices.

For instance, selection criteria in input selection module 418 may prioritize detection of patterns in video data from camera 412 over other data patterns of speech in audio data from microphone 408. Similarly, if input selection module 418 detects that a user is entering text via a keyboard 410, this text may be displayed, even when there is a matching data pattern in incoming audio data and/or in incoming video data.

In a further aspect, system 400 can utilize input-selection rules that prioritize certain data patterns when multiple matching data patterns are detected from a common input device. For instance, when explicit commands are received in audio data, the explicit commands may be given priority over implicit information in the audio data from input devices 404. As one specific example, selection criteria in input selection module 418 may specify that when a user says "show video" (e.g., when "show video" is detected in audio data from microphone 408), then this should be interpreted as an explicit command to select camera 412 as the input device and display video from camera 412.

It should be understood the input-selection rules can specify other hierarchies and/or other prioritizations of input devices and/or data patterns, without departing from the scope of the invention. Thus, input-selection rules may be based on one or more objectives in a specific implementation.

In a further aspect, there may be scenarios where the input-selection rules indicate that multiple input devices 404 should be selected. For example, a scenario may exist where text is detected in input data from keyboard 410 and speech is detected in audio data from microphone 408. In this scenario, speech-to-text module 432 may convert the speech from the audio data to text, and this text may be merged with the text from the keyboard for display. As another example, scenarios may exist where video or an image from camera 412 is displayed, and text is overlaid on top of the video or image. In such a scenario, the text may be obtained from the keyboard 410 and/or obtained via speech-to-text module 432 converting speech in audio data from microphone 408. In another example, a location input from location sensor 416 can be combined with text and/or video derived from one or more of input devices 406-414. Many other examples of combinations of multiple input devices, which combine a variable number of input devices, are also possible.

Prompts, corrections, and/or text segments can be displayed using HMD 401 and/or on another display device (not shown in FIG. 4A). Output can be provided to other devices than HMD 401; for example, output commands can be communicated via command interface 428. As another example, if system 400 is equipped with speaker(s), earphone(s), and/or earphone jack(s), audio output can be provided via the speaker(s), earphone(s), and/or earphone jack(s). Many other examples and/or outputs are possible as well.

Location module 420 can determine a location of system 400 based on input from input devices 404 generally, and camera(s) 412 and/or location sensor 416 specifically. For example, location module 420 can compare an input image taken by camera(s) 412 to images(s) stored as gaze/location data 424 to determine whether the two images are almost or exactly the same, and determine a location based on a known location associated with the stored image. As another example, location module 420 can request location information, such as latitude/longitude/altitude coordinates, from location sensor 416 to determine a location of system 400.

Figure 4B:
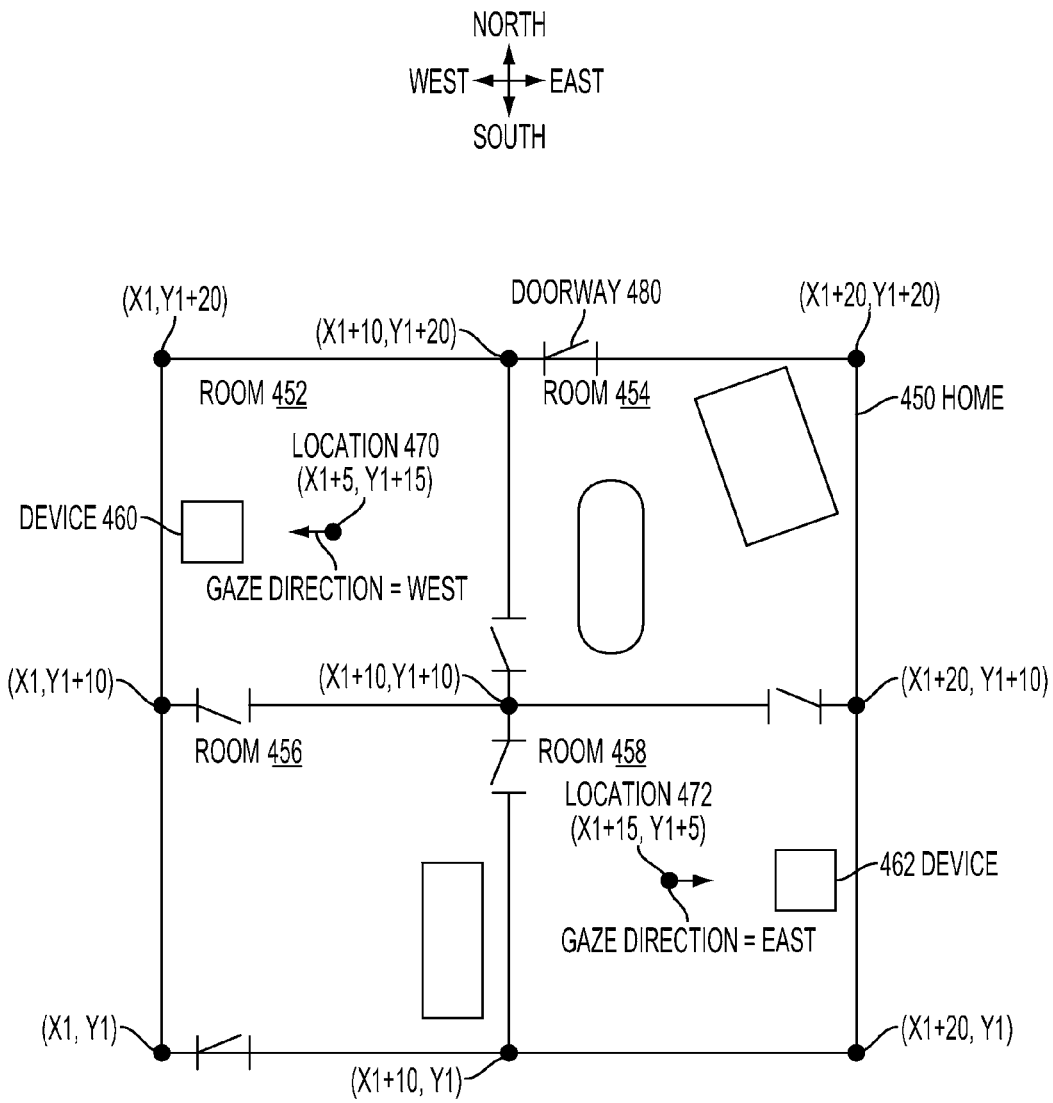
FIG. 4B depicts an example home, in accordance with an embodiment.

As an example, location module 420 can determine if system 400 is located within a given area or not. FIG. 4B shows an example home 450 with 4 square rooms: rooms 452, 454, 456, and 458 and each side length of each room is 10 units long. FIG. 4B shows that the coordinates of the southwestern corner of home 450 are (X1, Y1) and that the coordinates of the northeastern corner of home 450 are (X1+20, Y1+20). FIG. 4B shows the coordinates of each corner of each room as well; for the example of room 456, the southwestern corner has coordinates of (X1, Y1), the northwestern corner has coordinates of (X1, Y1+10), the northeastern corner has coordinates of (X1+10, Y1+10), and the southeastern corner has coordinates of (X1+10, Y1).

Based on these coordinates for room 456, system 400 can determine that any location with both X coordinates between X1 and X1+10 and Y coordinates between Y1 and Y1+10 is in room 456. Similarly, system 400 can determine that location 470 with coordinates (X1+5, Y1+15) is in room 452 and that location 472 with coordinates (X1+15, Y1+5) is in room 458.

Gaze direction module 422 can determine a gaze direction of a wearer of system 400 based on input from input devices 404 generally, and camera(s) 412 and/or location sensor 416 specifically. For example, gaze direction module 412 can compare an input image taken by camera(s) 412 to images(s) stored as gaze/location data 424 to determine whether the two images are almost or exactly the same, and determine a gaze direction based on a known gaze direction associated with the stored image. Gaze direction module 422 can use location information, such as latitude/longitude/altitude coordinates, provided by location sensor 416 to determine a gaze direction as well.

For example, suppose that gaze/location data 424 include images of two identical devices, such as devices 460 and 462 of FIG. 4B: one image taken at location 470 with gaze direction West, and one at location 472 with a gaze direction of East. As shown in FIG. 4B, location 470 has coordinates (X1+5, Y1+15) which differ from the coordinates (X1+15, Y1+5) of location 472.

Then, upon reception at gaze direction module 422 of an input image that shows device 460 or 462, gaze direction module 422 can request location information from location sensor 416 to determine a current location LC. Gaze direction module 422 can separately compare LC with each of locations 470 and 472 to determine if LC is closer to location 470 or location 472. In this example, suppose that LC=(X1+14.5, Y1+5.5), so that the difference of (LC-location 470)=(9.5,−9.5) and the difference of (LC-location 472)=(−0.5, 0.5). Then, the distance D squared between LC and each location is: $D^2=d_x^2+d_y^2$, where $d_x$ is the difference between X dimensions and $d_y$ is the difference between y dimensions. Calculating $D^2$ for location 470 is 180.5 and $D^2$ for location 472 is 0.5. As location 472 is much closer to LC than location 470, gaze direction module 422 can determine that a current gaze direction is likely to be a gaze direction associated with the image taken at location 472, which in this example is East as shown in FIG. 4B.

As another example, gaze direction module 422 can determine that a device is not shown in one or more images captured by camera(s) 412. Based on that determination, gaze direction module 422 can determine that the current gaze direction is not in the direction of the device. For example, suppose that a first series of images taken by a field-of-view camera 412 show part or all of an external display, and that a second image, taken after the first series of images, does not include part or all of the external display. Gaze direction module 422 then can determine that the external display is not in the second image, and thus, that a wearer of system 400 was not gazing at the external display at the time of taking the second image.

Example Scenarios for Automatic Control of Devices

Figure 5:
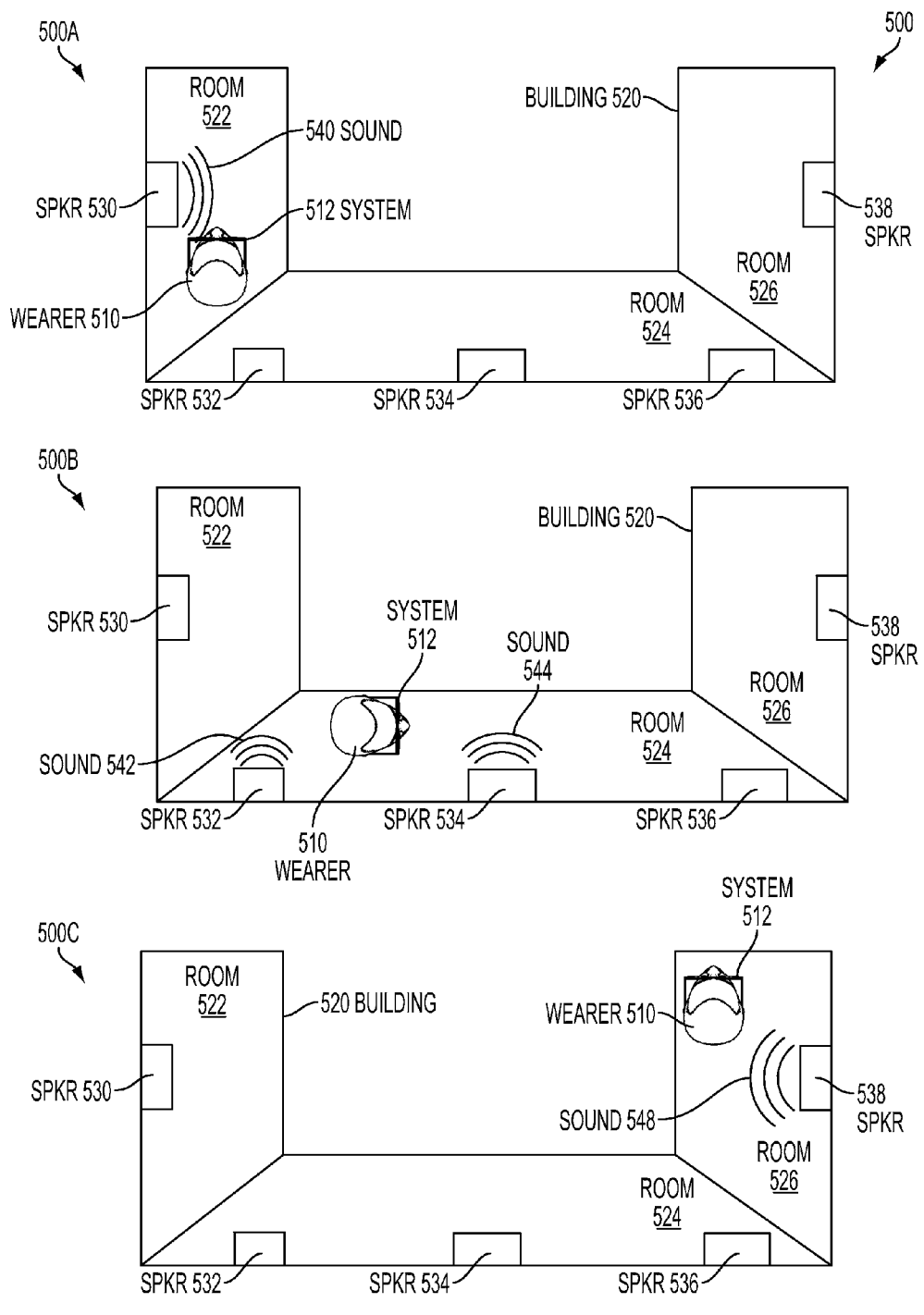
FIG. 5 depicts an example scenario for automatically activating devices based on location, in accordance with an embodiment.

FIG. 5 depicts an example scenario 500 for automatically activating devices based on location, in accordance with an embodiment. At 500A of FIG. 5, an overhead view shows wearer 510 wearing system 512 in room 522 of building 520. An example of system 512 is system 400 discussed above in the context of FIG. 4A.

FIG. 5 shows building 520 has rooms 522, 524, and 526, where room 522 has speaker (Spkr) 530, room 524 has speakers 532, 534, and 536, and room 526 has speaker 538. Speakers 530-538 are being driven by a device, such as a stereo or television, not shown in FIG. 5.

At 500A of FIG. 5, system 512 has determined a current location of the system is room 522, and that one device, speaker 530, is also in room 522. For example, system 512 can determine the current location using a location sensor, such as location sensor 416, and can determine locations of speakers 530-538 using stored data, such as gaze/location data 424, or via other techniques. Once system 512 has determined the current location and the locations of speakers 530-538, system 512 can determine that only speaker 530 of speakers 530-538 is close enough to system 512 to request activation.

System 512 can determine which devices (in this example, speakers) are close enough to request activation by determining a distance measure for each device. For example, the distance measure for speaker 534 can be the geometric distance between speaker 534 and the current location, the square of the distance between speaker 534 and the current location, a grid-based distance, e.g., rectilinear distance (a.k.a. Manhattan, city block, or taxicab distance), or some other distance metric between speaker 534 and the current location. Once the distance measure has been determined for each device, the distance measure can be compared to a threshold distance measure, and any device whose distance measure is less than the threshold distance measure can be determined to be close enough to request activation; while any device whose distance measure is greater than the threshold distance measure can be determined not to be close enough to request activation, and, in some cases, can be deactivated.

In some embodiments, more than one threshold distance measure can be utilized; for example, the threshold distance measure can be specified on a per device basis. Another example is the use of class-specific threshold distance measures; that is, where all devices of the same class of device share a common threshold. For examples, all TVs can share a first threshold distance measure, all speakers can share a separate second threshold distance measure, all tuners/radios can share a third threshold distance measure separate from the first and second threshold distance measures, and so on. Other distance measures, and threshold distance measures are possible as well.

System 512 can request activation of speaker 530 via sending a command to speaker 530, the device driving speaker 530, and/or any other device that can activate speaker 530. At this time, system 512 can also request deactivation of speakers 532-538, if necessary. At 500A of scenario 500, speakers 532-538 are not shown as emitting sound, so system 512 may determine that deactivation of speakers 532-538 is unnecessary.

Upon requesting activation of speaker 530, speaker 530 can emit sound 540, perhaps to be listened to by wearer 510. Electrical signals for producing sound 540 can be generated by the device driving speaker 530, which can then convert the electrical signals into sounds, such as sound 540.

At 500B of FIG. 5, wearer 510 has moved to room 524 of building 520 between speakers 532 and 534. System 512 can determine the current location and the locations of speakers 530-538, as discussed above, and determine that speakers 532 and 534 are close enough to system 512 to request activation, as also discussed above. System 512 can request activation of speakers 532 and 534 via sending command(s) to speakers 532 and 534, the device driving speakers 532 and 534, and/or any other device that can activate speakers 532 and 534. FIG. 5 shows, at block 500B, that speakers 532 and 534 have been activated as sounds 542 and 544 are shown as being emitted respectively from speakers 532 and 534.

Also, system 512 can determine that speaker 530 is no longer close enough to request activation, and can subsequently request deactivation of speaker 530. FIG. 5 shows, at block 500B, that speaker 530 has been deactivated as sound 540 is no longer shown as being emitted from speaker 530.

At 500C of FIG. 5, wearer 510 has moved to room 526 of building 520 near to speaker 538. System 512 can determine the current location and the locations of speakers 530-538, as discussed above, and determine that speaker 538 is close enough to system 512 to request activation, as also discussed above. System 512 can request activation of speaker 538 via sending command(s) to speaker 538, the device driving speaker 538, and/or any other device that can activate speaker 538. FIG. 5 shows, at block 500C, that speaker 538 has been activated as sound 548 is shown being emitted from speaker 538.

Also, system 512 can determine that speakers 532 and 534 are no longer close enough to request activation, and can subsequently request deactivation of speakers 532 and 534. FIG. 5 shows, at block 500C, that speakers 532 and 534 have been deactivated as respective sounds 542 and 544 are no longer shown as being emitted from speakers 532 and 534.

Figure 6:
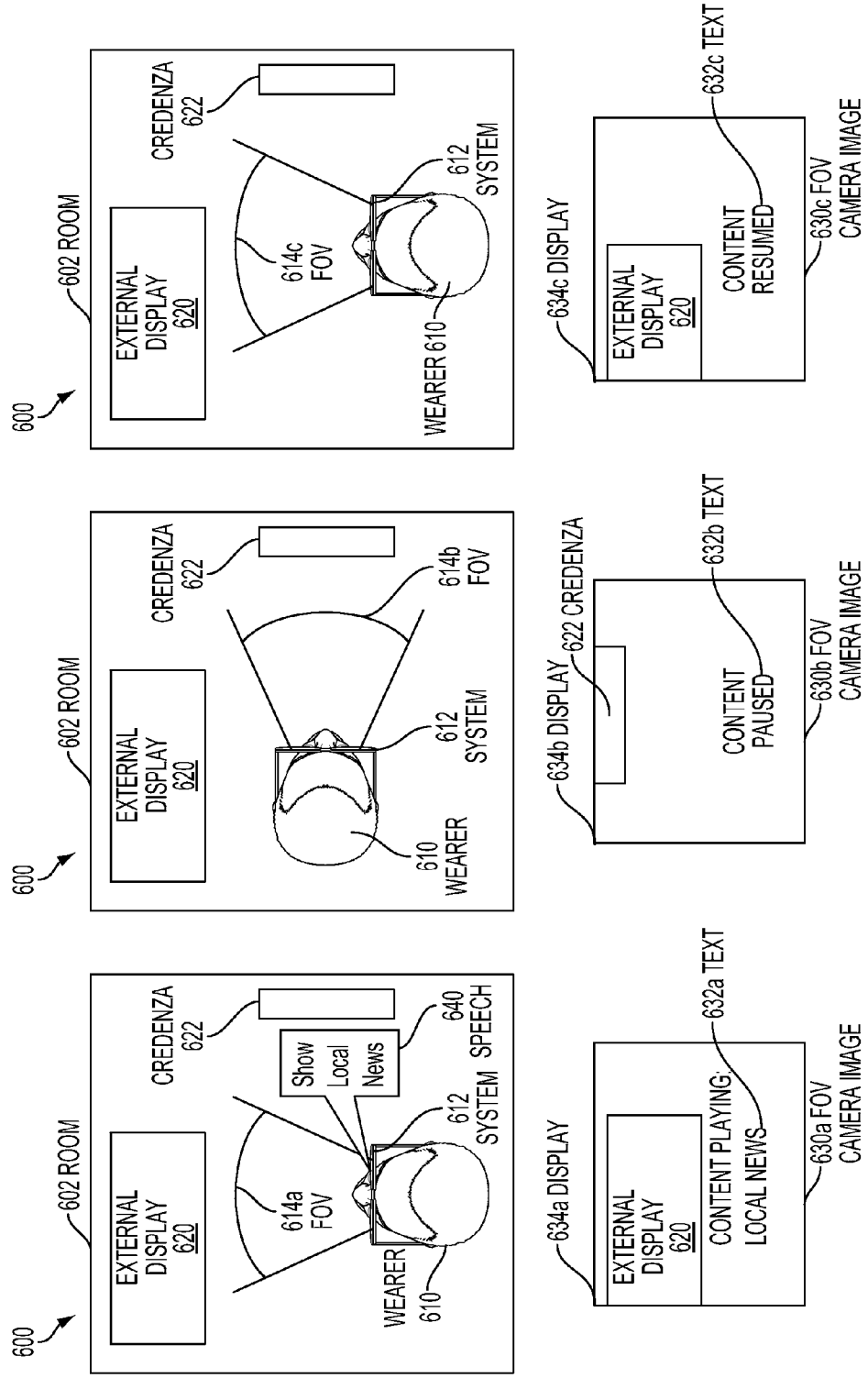
FIGS. 6A-6C depict an example scenario for automatically pausing and resuming device play, in accordance with an embodiment.

FIGS. 6A-6C depict an example scenario 600 for automatically pausing and resuming device play, in accordance with an embodiment. FIG. 6A shows wearer 610 wearing system 612 in room 602 and facing external display 620. An example of system 612 is system 400 discussed above in the context of FIG. 4A. Examples of external display 620 include, but are not limited to, a television set and a computer display. In scenario 600, external display 620 is showing audio-video content, such as a movie, video clip, recorded concert, lecture, television, or other audio-video content. FIG. 6A shows that room 602 also includes a credenza 622. System 612 is configured to control external display 620 but is not configured to control credenza 622.

During scenario 600 and as shown in FIG. 6A, wearer 610 utters speech 640 of "Show Local News." Selection criteria may specify that when a user says "show" while gazing at an object, then the input speech should be interpreted as a voice command to show specified video and/or audio-video content using the object. In scenario 600, as wearer 610 is gazing at external display 620 while uttering speech 640, system 612 determines that speech 640 is to be interpreted as a command to show "Local News" on external display 620. Other voice commands are possible as well, such as, but not limited to: pause, rewind, fast forward, turn on, turn off, start, stop, brighten, darken, change channel, change station, rotate, pan, zoom in, and zoom out.

System 612 can generate a display to provide device status information, perhaps to wearer 610. FIG. 6A shows display 634a combining a field-of-view (FOV) image 630a with text 632a. Field-of-view images, such as field-of-view image 630a, can be captured by a field-of-view camera of system 612 to depict a field-of-view of wearer 610. Field-of-view image 630a is shown in FIG. 6A depicting part of external display 620 on the left-hand side of field-of-view camera image 630a, as external display 620 is in the field of view 614a as shown in FIG. 6A. FIG. 6A shows text 632a "Content Playing: Local News", indicating that external display 620 is showing the local news as audio-video content.

In FIG. 6B, scenario 600 continues with wearer 610 turning approximately 90 degrees to the right to face credenza 622, as indicated by field-of-view 614b including credenza 622 and not including external display 620. Correspondingly, field-of-view camera image 630b of FIG. 6B shows credenza 622 but does not show external display 620.

Upon applying image processing techniques to field-of-view camera image 630b, system 600 can determine that external display 620 is not in field-of-view 614b of wearer 610. As external display 620 is not in field-of-view 614b, system 600 can infer that (a) wearer 610 is likely not observing at least a video portion of the audio-video content, and so (b) the audio-video content should be paused; i.e., temporarily stopped.

Upon determining that external display 620 is not in field-of-view 614b, system 600 can generate and send a command to external display 620, or a device driving external display 620, to pause play of the audio-video context. FIG. 6B shows display 634b as generated by system 612 that combines field-of-view image 630b with text 632b to provide device status. Field-of-view image 630b is shown in FIG. 6B depicting credenza 622, as credenza 622 is approximately centered in field of view 614b as shown in FIG. 6B. Additionally, FIG. 6B shows text 632b "Content Paused", indicating that external display 620 has temporarily stopped showing content.

In FIG. 6C, scenario 600 continues with wearer 610 having turned back approximately 90 degrees to the left to face external display 620, as indicated by field-of-view 614c including external display 620 and not including credenza 622. Correspondingly, field-of-view camera image 630c of FIG. 6C shows part of external display 620 but does not show credenza 622.

Upon applying image processing techniques to field-of-view camera image 630c, system 600 can determine that external display 620 is in field-of-view 614c of wearer 610. As external display 620 is in field-of-view 614c, system 600 can infer that (a) wearer 610 likely wants to observe at least the video portion of the audio-video content, and so (b) the audio-video content should be resumed.

Upon determining that external display 620 is in field-of-view 614c, system 600 can generate and send a command to external display 620, or a device driving external display 620, to resume play of the audio-video context. FIG. 6C shows display 634c generated by system 612 combining field-of-view image 630c with text 632c to provide device status. Field-of-view image 630c is shown in FIG. 6C depicting a portion of external display 620, as external display 620 partially occupies field of view 614c as shown in FIG. 6C. Additionally, FIG. 6C shows text 632c "Content Resumed", indicating that external display 620 has resumed showing of the audio-video content.

Figure 7:
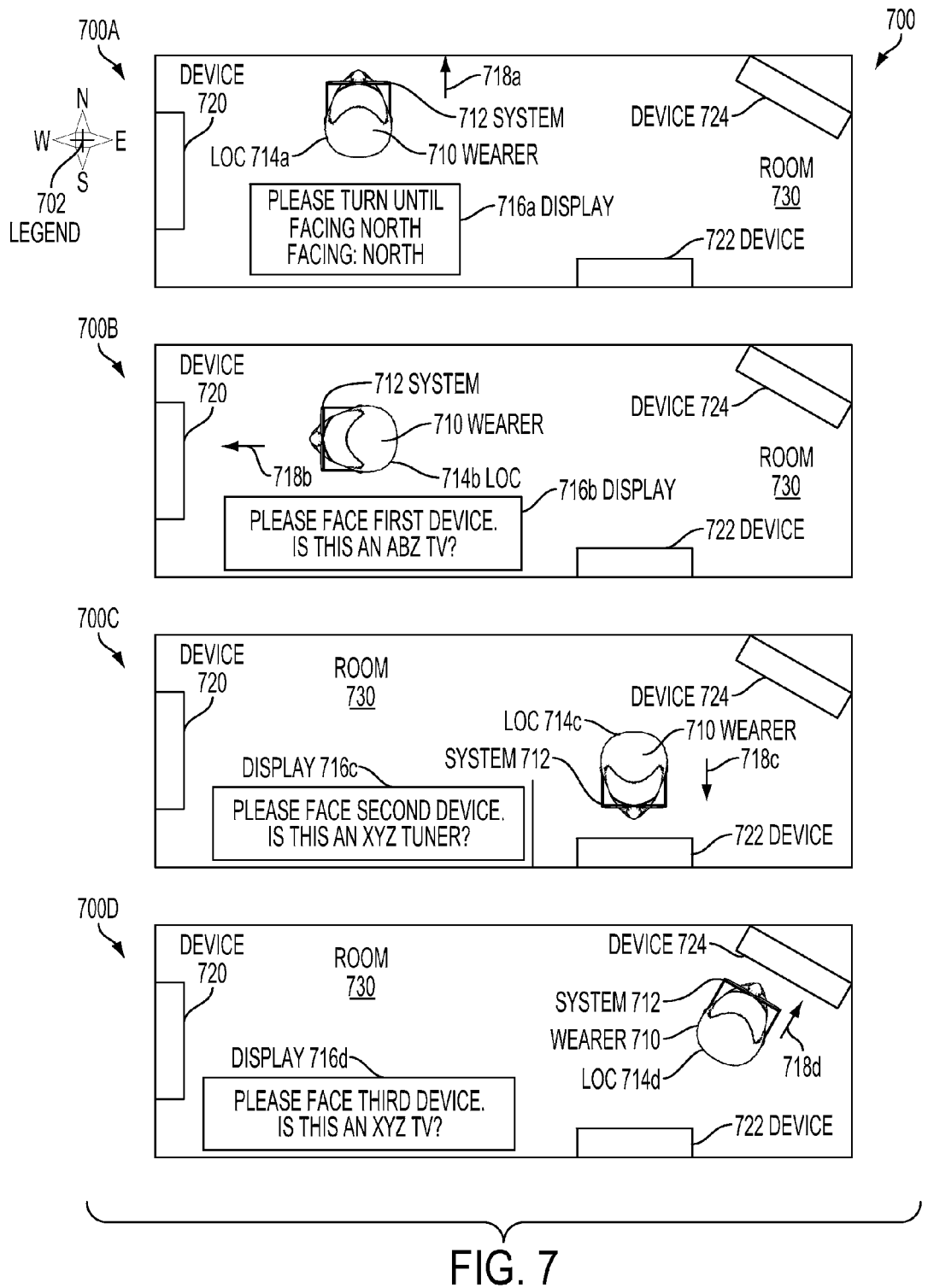
FIG. 7 depicts an example scenario for training a wearable computing device, in accordance with an embodiment.

FIG. 7 depicts an example scenario 700 for training a wearable computing device, in accordance with an embodiment. At 700A of FIG. 7, scenario 700 begins with wearer 710 in room 730 oriented facing in the direction of orientation 718a to train system 712 to recognize three devices: devices 720, 722, and 724. An example of system 712 is system 400 discussed above in the context of FIG. 4A.

As indicated by display 716a, orientation 718a, and legend 702, wearer 710 is oriented to face North. Display 716a instructs wearer 710 to "Please Turn until Facing North" and, once wearer 710 has complied, indicates wearer 710 is "Facing; North." Display 716a can correspond to part or all of a head-mounted display associated with system 712.

In some embodiments, system 712 can be equipped with a compass or other device that can be used to provide orientation information, via display 716a or otherwise, to wearer 710. Starting in an initial known position and orientation permits system 712 to use dead reckoning and/or other techniques that involve starting with known initial position and/or orientation. In some embodiments, initializing system 712 such as shown at 700A of FIG. 7 is not required.

Once wearer 710 is facing in a known initial orientation, such as orientation 718a, system 712 can store the known initial orientation. As wearer 710 moves throughout the training scenario 700, system 712 can use location and/or other sensors to determine changes in orientation. Then, system 712 can accumulate the changes in orientation to determine a current orientation. For example, if system 712 starts facing North (0 degrees), changes orientation by turning left 90 degrees to face West (270 degrees), changes orientation again by turning left 135 more degrees to face Southeast (135 degrees), and then changes orientation by turning right 45 degrees to face South (180 degrees), system 712 can track and accumulate these changes in orientation of −90 degrees, −135 degrees, and +45 degrees, leading to a net orientation change of −180 degrees, to maintain the current orientation of system 712 throughout the training scenario based on the initial orientation (0 degrees) and the net orientation change (−180 degrees). Other techniques are possible as well.

When system 712 stops moving and/or at other times, system 712 can store the current location, such as determined by a location sensor, and the current orientation, perhaps determined as discussed above as a "gaze ray." The gaze ray can includes a gaze point and a gaze direction. For example, system 712 can store current location 714a as a gaze point of the gaze ray and orientation 718a as a gaze direction of the gaze ray. Many other techniques for storing information learned during training scenario 700 are possible as well.

In other embodiments, system 712 can store information about room 730 as well; for example, a room name such as "Living Room" or "Kitchen", information about the size and location of room 730, and/or other information about room 730.

At 700B of FIG. 7, scenario 700 continues with wearer 710 at location 714b facing in orientation 718b of West toward device 720. At 700B of FIG. 7, system 712 can store the gaze ray associated with device 720 having gaze location of location 714b and gaze direction of orientation 718b.

FIG. 7 shows that display 716b both requests wearer 710 to "face first device" and asks wearer 710 if the first device is "an ABZ TV"; that is, if device 720 is both (a) made by the ABZ Company and (b) is a TV. In some embodiments, system 712 can estimate a device class (e.g., tuner, TV, Blu-Ray player, DVD/CD player, tape player, etc.) and/or a manufacturer of device 720, e.g., that device 720 is an ABZ TV, without user instruction. For example, system 712 can estimate the class and/or the manufacturer of device 720 based on images captured of device 720, information about TVs generally and ABZ TVs specifically, format of messages received from device 720, frequencies used by device 720 for remote control, and/or based on other data related to device 720. In other embodiments, system 712 can be instructed by a user, such as wearer 710, about a class and/or manufacturer of device 720, either instead of or along with functionality in system 712 to estimate class and/or manufacturer of device 720.

If device 720 is an "ABZ TV" then system 712 can communicate with device 720 using remote control commands, frequencies, timing, etc. for an ABZ TV; otherwise, system 712 can otherwise determine a device class and a device manufacturer to determine messages used to remotely control device 720, frequencies used by device 720 for remote control, etc.

At 700C of FIG. 7, scenario 700 continues with wearer 710 at location 714c facing in orientation 718c of South toward device 722. At 700C of FIG. 7, system 712 can store a gaze ray associated with device 722 having gaze location of location 714c and gaze direction having orientation 718c.

FIG. 7 shows that display 716c both requests wearer 710 to "face second device" and asks wearer 710 if the second device is "an XYZ tuner"; that is, if device 722 is both (a) made by the XYZ Company and (b) is a tuner. System 712 can estimate that device 722 is an XYZ tuner based on images captured of device 722, information about tuners generally and XYZ tuners specifically, format of messages received from device 722, frequencies used by device 722 for remote control, and/or based on other data related to device 722.

If device 722 is an "XYZ tuner," then system 712 can communicate with device 722 using remote control commands, frequencies, timing, etc. for an XYZ tuner; otherwise, system 712 can otherwise determine a device type and a device manufacturer to determine messages used to remotely control device 722, frequencies used by device 722 for remote control, etc.

At 700D of FIG. 7, scenario 700 continues with wearer 710 at location 714d facing in orientation 718d of Northeast toward device 724. At 700D of FIG. 7, system 712 can store a gaze ray associated with device 724 having gaze location of location 714d and gaze direction having orientation 718d. FIG. 7 shows that display 716d both requests wearer 710 to "face third device" and asks wearer 710 if the third device is "an XYZ TV." System 712 can estimate that device 724 is an XYZ TV as discussed above for devices 720 and 722.

If device 724 is an "XYZ TV," then system 712 can communicate with device 724 using remote control commands, frequencies, timing, etc. for an XYZ TV; otherwise, system 712 can otherwise determine a device type and a device manufacturer to determine messages used to remotely control device 724, frequencies used by device 724 for remote control, etc.

Scenario 700 can end after determining and storing information about device 724. As a result of training scenario 700, device 710 could have recorded at least the information about devices 720, 722, and 724 and room 730 shown in a data structure, objects, and/or otherwise stored in system 712, such as shown Table 1 below, with a row for "device 0" storing initial information.

TABLE 1

| Room | Device | Device Mfr. | Device Type | Gaze Location | Gaze Direction |
|---|---|---|---|---|---|
| 730 | 0 | n/a | n/a | 714a | North |
| 730 | 1 | ABZ | TV | 714b | West |
| 730 | 2 | XYZ | Tuner | 714c | South |
| 730 | 3 | XYZ | TV | 714d | Northeast |

In other embodiments, more, less, and/or different information can be stored as a result of a training scenario. For example, device manufacturer and device type information can be replaced with remote control information, such as frequency, commands, formatting information, timing, and/or other information used to communicate remote controls and perhaps receive responses from devices communicated with during the training scenario. As another example, any information captured about room 730, such as name, dimensions, location information, etc. can be stored in system 712 as well. Many other types of information can be stored as part of training scenarios as well.

Figure 8:
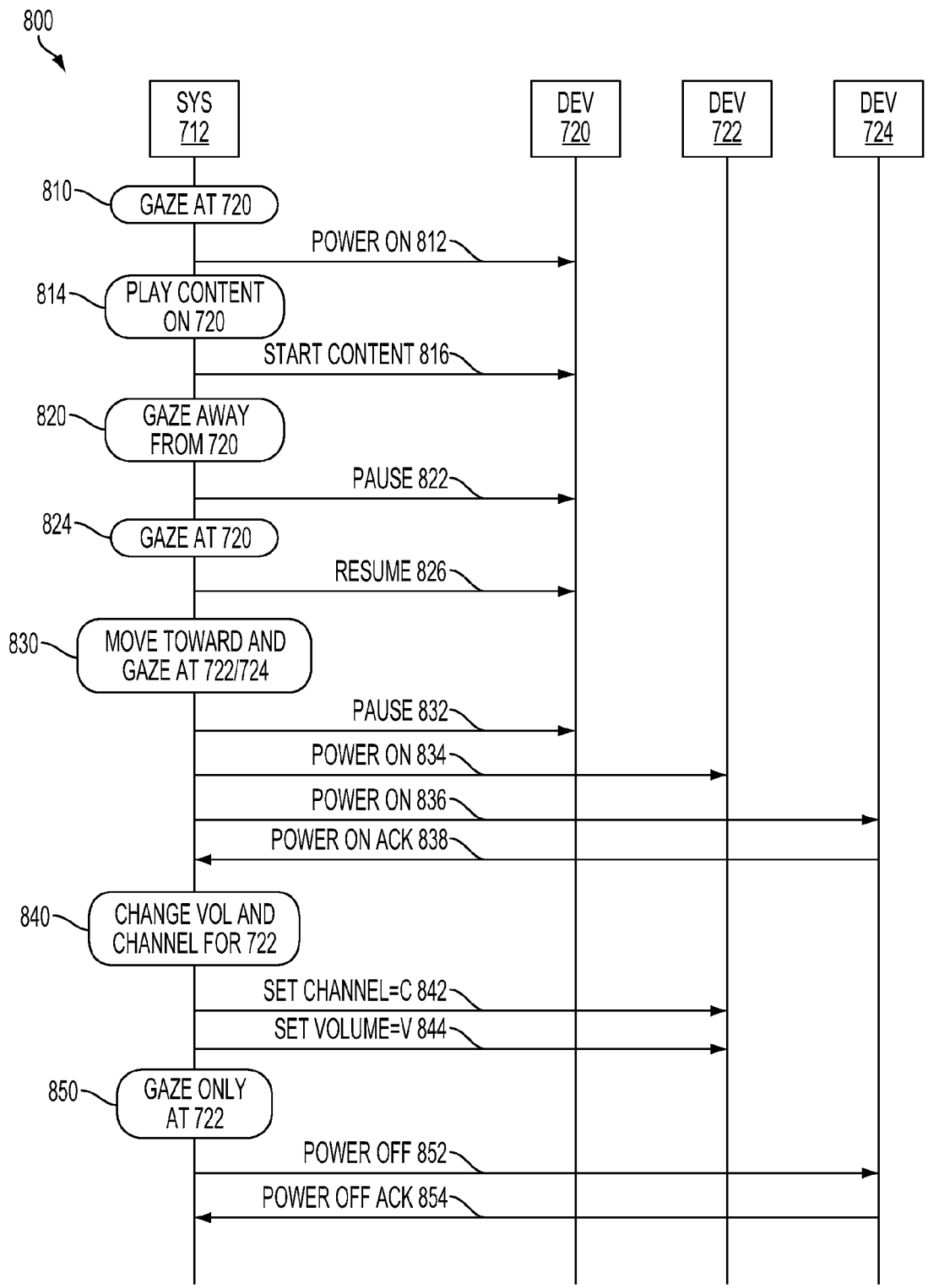
FIG. 8 depicts an example scenario of communications between a wearable computing device and devices shown in FIG. 7, in accordance with an embodiment.

FIG. 8 depicts example scenario 800 of communications between a wearable computing device and devices shown in FIG. 7, in accordance with an embodiment. After completing training scenario 700, system 712 can communicate with and control devices 720, 722, and 724. In scenario 800, device 724 provides acknowledgments to received messages, while devices 720 and 722 do not provide such acknowledgments.

Scenario 800 begins at 810 where wearer 710 gazes at device 720. System 712 can determine that wearer 710 is gazing at device 720 based on receiving one or more images of device 720 from a camera, such as field-of-view camera. Then, perhaps utilizing stored information and/or image processing techniques, system 712 can determine that the one or more images show part or all of device 720.

In some embodiments, system 712 can infer that wearer 710 is or is not gazing at device 720, based on an image threshold and/or an image-time amount. For example, suppose field-of-view camera is a video camera taking X images per second; e.g., X=24 or 30. Then, system 712 can infer that a device, such as device 720, is being gazed at when an image threshold number or more images (e.g., X/2 images) per image-time interval (e.g., one second) show least part of the device. For example, suppose that the video camera takes 24 images per second; then an example image threshold would be 12, and a corresponding image-time threshold would be one second. Similarly, system 712 can infer that a device is not being gazed at when the image threshold number or more images taken during the image-time interval do not show at least part of the device.

In other embodiments, a continuous-image threshold can specify a number of continuous images that must (or must not) show at least part of the device to determine that the device is (or is not) being gazed at; for the example above, to ensure that a gaze lasts at least one second, the corresponding continuous-image threshold can be set to a value greater than X; such as 30.

In other embodiments, image thresholds for gazing can differ from image thresholds used to determine not gazing; for example, a continuous-image threshold for gazing can be smaller than a corresponding continuous-image threshold for not gazing, to permit faster system response on an initial gaze at the device and/or to ensure the wearer looks away for a longer period of time before determining that wearer is no longer gazing at the device.

In other embodiments, system 712 can infer that wearer 710 is gazing at device 720 based on a comparison of current location and orientation information with stored location and orientation information. For example, using the data stored in Table 1 above, system 712 can determine a current location and current orientation and compare the current location to the locations stored in Table 1 to determine a stored location closest to the current location. Then, system 712 can compare the current orientation to a stored orientation associated with the closest stored location. For example, if system 712 infers that device 720 is being gazed at using the data in Table 1, then it is likely that the closest stored location is 714b and the current direction is West.

In some of these other embodiments, threshold values can be used to aid determination of gazed-at devices. For example, suppose that a location-threshold value of 1 meter and an orientation-threshold value of 10 degrees are used to infer that wearer 710 is gazing at device 720. Using the data in Table 1 again, use of the threshold values implies that wearer 712 is within 1 meter of location 714b and is gazing in a direction between 260 degrees and 280 degrees, as West=270 degrees. Other threshold values are possible as well.

Once system 712 infers that wearer 710 is gazing at device 720, then system 712 can send power on command 812 to device 720 to turn on device 720. In this example, device 720 does not provide acknowledgments, but system 712 can infer that device 720 is on based on subsequent observations of room 730. For example, system 712 can observe that upon turning on device 720, that device 720 is brighter, displays text and/or images, and/or emits sound.

At block 814 of scenario 800, wearer 710 of system 712 instructs system 712 to have device 720 to play content. In response, system 712 sends start content message 816 to device 720 to play content. In scenario 800, upon reception of start content message 816, device 720 begins playing the requested content.

At block 820 of scenario 800, wearer 710 of system 712 gazes away from device 720. System 712 can infer that wearer 710 has gazed away from device 720 by determining that device 720 is not in one or more images taken by a camera associated with system 712 and/or based on location and orientation information such as discussed above.

In response, system 712 sends pause message 822 to device 720, instructing device 720 to temporarily stop playing the content begun in response to start content message 816.

At block 824 of scenario 800, wearer 710 gazes at device 720. System 712 can infer that wearer 710 has gazed at device 720 by determining that device 720 is in one or more images taken by a camera associated with system 712 and/or based on location and orientation information such as discussed above. In response, system 712 sends resume message 826 to device 720, instructing device 720 to restart playing the content paused via pause message 822.

At block 830 of scenario 800, wearer 710 gazes away from device 720 and gazes at devices 722 and 724. System 712 can infer that wearer 710 has gazed away from device 720 by determining that device 720 is not in one or more images taken by a camera associated with system 712 and/or based on location and orientation information such as discussed above. System 712 can infer that wearer 710 has gazed at devices 722 and 724 by determining that device 722 and 724 are in one or more images taken by a camera associated with system 712 and/or based on location and orientation information such as discussed above.

In response to inferring that wearer 710 is no longer gazing at device 720, system 712 can send pause message 832 to device 720 to temporarily stop playing the content begun in response to start content message 816.

Also, in response to inferring the wearer 710 is gazing at devices 722 and 724, system 712 can send power on messages 834 and 836 to devices 722 and 724, respectively. In response, device 724 can send power on acknowledgement (ACK) message 838 to confirm receipt of power on message 836.

At block 840 of scenario 800, wearer 710 instructs system 712 to change the channel to Channel C and change the volume to V for device 722. For example, wearer 710 can use a microphone, keyboard, touch screen and/or input devices to provide instructions to instruct system 712 to change the channel to Channel C and change the volume to V for device 722. In response, system 712 can send set channel message 842 instructing device 722 to set the channel to C, and send set volume message 844 instructing device 722 to set the volume to V.

At block 850 of scenario 800, wearer 710 gazes only at device 722; that is, wearer 710 is no longer gazing at device 724. System 712 can infer that wearer 712 gazed away from device 724 by determining that device 724 is not in one or more images taken by a camera associated with system 712 and/or based on location and orientation information such as discussed above. In response to inferring that wearer 710 is no longer gazing at device 724, system 712 can send power off message 852 to device 724 to shut down device 724. Then, in response to power off message 852, device 724 can send power off acknowledgment message 854 before powering off.

In some embodiments, a "manual override" feature can be used. For example, suppose two controllable devices—a TV and a lamp are near to each other. If a wearer of system 712 gazes at the TV constantly when watching but also gazes intermittently at the lamp, the lamp can be powered on and off a number of times while the wearer watches the TV. The manual override feature can involve setting a continuous-image threshold to a relatively large number, such as 100 or more; e.g., only send messages to power up or down the device if 100 (or more) continuous images that show at least part of device are taken.

The manual override feature can also request confirmation before powering up (or down) the device; e.g., once system 712 determines wearer 710 is gazing at a device configured with manual override, system 712 can prompt wearer 710 to confirm sending of a power up (or down) command before sending the command. However, in this example, the TV may not utilize the manual override command, and so is powered up (or down) or paused/resumed based on the gaze of wearer 710 alone.

Many other examples of devices, communications, messages, and parameters, are possible as well.

Figure 9A:
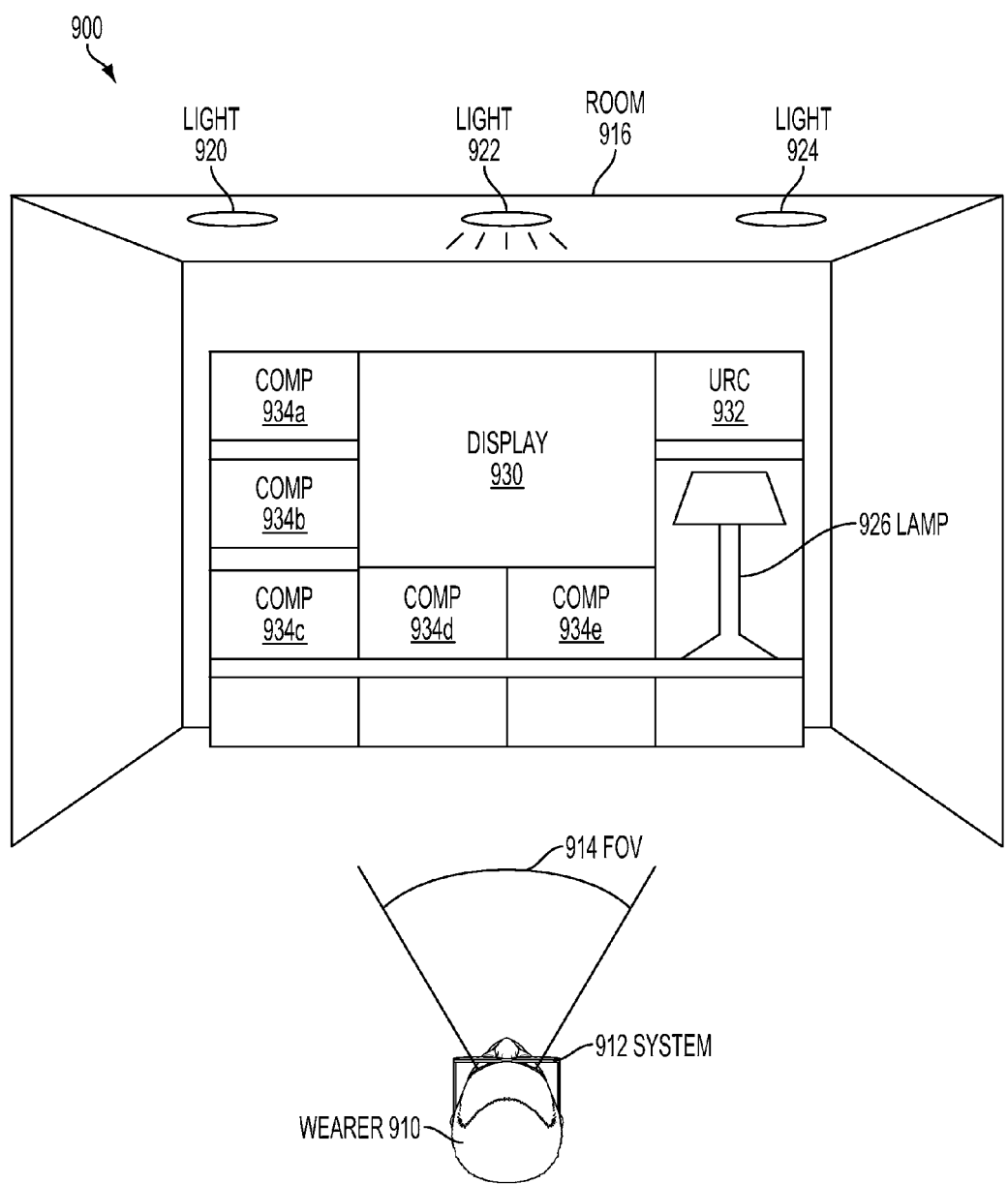
FIGS. 9A-9G depict an example scenario for controlling various devices, in accordance with an embodiment.

FIGS. 9A-9G depict an example scenario 900 for controlling various devices, in accordance with an embodiment. FIG. 9A shows wearer 910 wearing system 912 and gazing with field-of-view 914 in room 916. An example of system 912 is system 400 discussed above in the context of FIG. 4A.

FIG. 9A shows room 916 containing lights 920, 922, and 924, lamp 926, display 930, universal remote controller (URC) 932, and components 934a-934e. FIG. 9A shows light 922 as being on, as indicated with the lines radiating away from light 922, and light 920, light 924, and lamp 926 being off. Also, display 930 and components 934a-934e are shown as being off.

Universal remote controller 932 is configured to receive remote-control signals from system 912 and transmit corresponding remote-control signals to lights 920-924, lamp 926, display 930, and/or components 934a-934e. System 912 can be configured to send commands to universal remote controller 932. Universal remote controller 932 can be configured to decode a command from system 912 to a device, translate the command into a remote-control command suitable for use by the device, and transmit the remote-control command to the device. In scenarios other than those shown in FIGS. 9A-9G, system 912 can send the remote-control commands to devices 920-930 and 934a-934e directly; that is, without using universal remote controller 932.

Figure 9B:
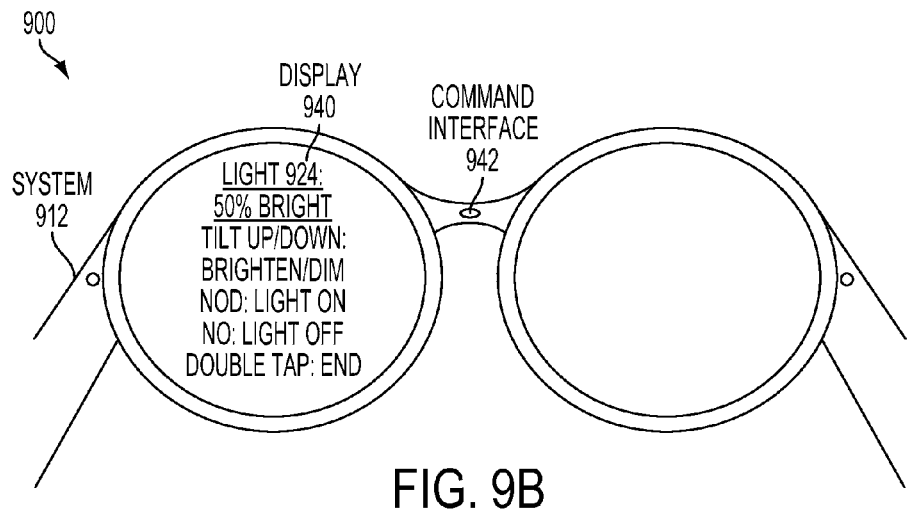

FIG. 9B shows a lighting-control session of scenario 900 to change the lighting in room 916 using system 912. To change the lighting in room 916, system 912 provides display 940 to control light 924. Display 940 indicates a current status of light 924 of "50% bright", and a series of instructions to use gestures to control light 924 in the lighting-control session. Display 940 instructs wearer 910 to tilt the wearer's head up to brighten light 924 and to tilt the wearer's head down to dim light 924 with the text of "Tilt Up/Down: brighten/dim" during the lighting-control session. Other instructions to wearer 910 in display 940 for the lighting-control session can include an instruction to nod to turn light 924 on, to shake the wearer's head as if saying "No" to turn light 924 off, and/or to make two quick taps (double tap) on a touch pad of system 912 to end the lighting-control session.

Upon determining that wearer 910 made any gestures or otherwise provided controls for the lighting-control session, system 912 can decode the gestures or other controls to generate the appropriate control message to the controlled device. For example, if wearer 910 tilted the wearer's head up in response to display 940, system 912 can then: (a) decode the movement as a "tilt up" gesture, (b) determine that, at the time of the gesture, the tilt up gesture indicates wearer 910 is instructing system 912 to increase the brightness of light 924, (c) generate a command to light 924, perhaps via universal remote controller 932, to increase its brightness, and (d) update display 940 to show that light 924 is brighter; e.g., change display 940 to say light 924 is "60% bright." Upon generating the appropriate control message(s), the control messages can be sent using command interface 942 to the controlled device(s). In scenarios where the controlled device(s) is/are configured to send commands and/or other information to system 912, the commands and/or other information can be received using command interface 942.

In other embodiments, system 912 can generate the appropriate control message to the controlled device based on other types of user inputs than head movements. Examples of these other types of user inputs include, but are not limited to, the above-mentioned techniques for gazing controls, other gestures, textual input, audio commands, video/image commands, and other kinds of input. Other examples of controls, messages, and inputs are possible as well.

In some embodiments not shown in FIGS. 9A-9G, system 912 can be configured to permit wearer 910 to select device(s) for control. For example, upon receiving a request from wearer 910 to control a device, system 912 can generate a menu listing all devices controllable by system 912. In scenario 900 the menu listing would include devices 920-930, and 934a-934e. After displaying the menu, wearer 910 can then select device(s) from the menu to be controlled. In other embodiments, controllable devices can be shown in a figure depicting their locations in a given room, such as the view of devices 920-930, and 934a-934e shown in FIG. 9C.

Figure 9C:
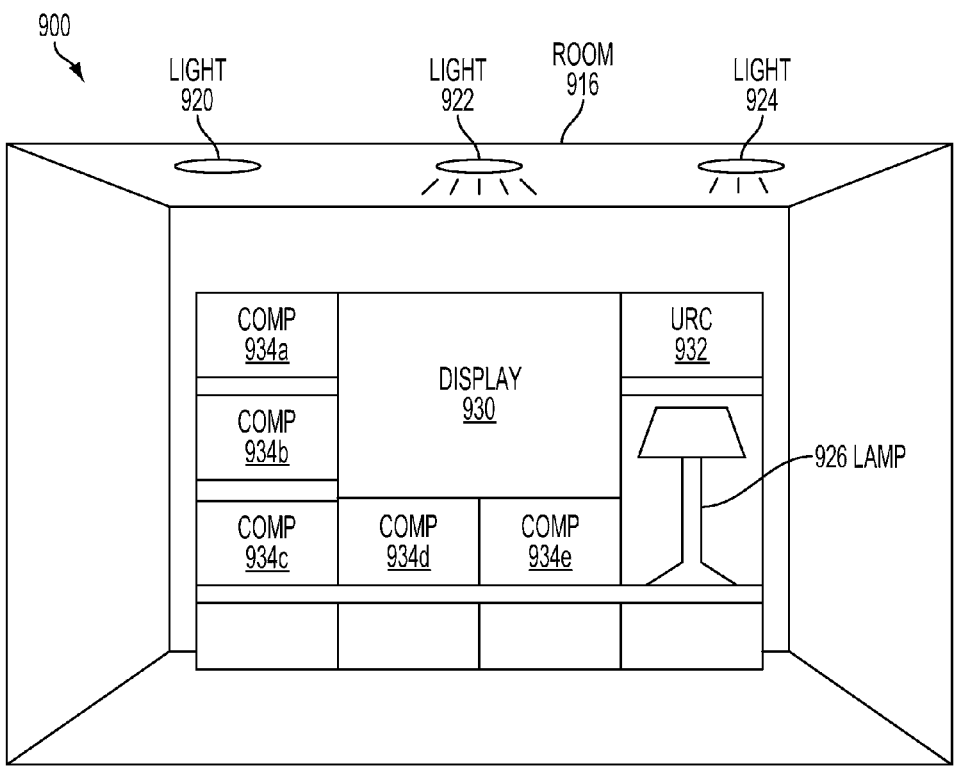

FIG. 9C depicts lines radiating from light 924, indicating that light 924 has been turned on as a result of the lighting-control session discussed above in the context of FIG. 9B. FIG. 9C shows fewer lines radiated from light 924 than from light 922, indicating that light 924 is dimmer than light 922. In other scenarios not shown in FIGS. 9A-9G, wearer 910 can turn on more or fewer lights than light 924 alone, and/or can turn off light 922.

Figure 9D:
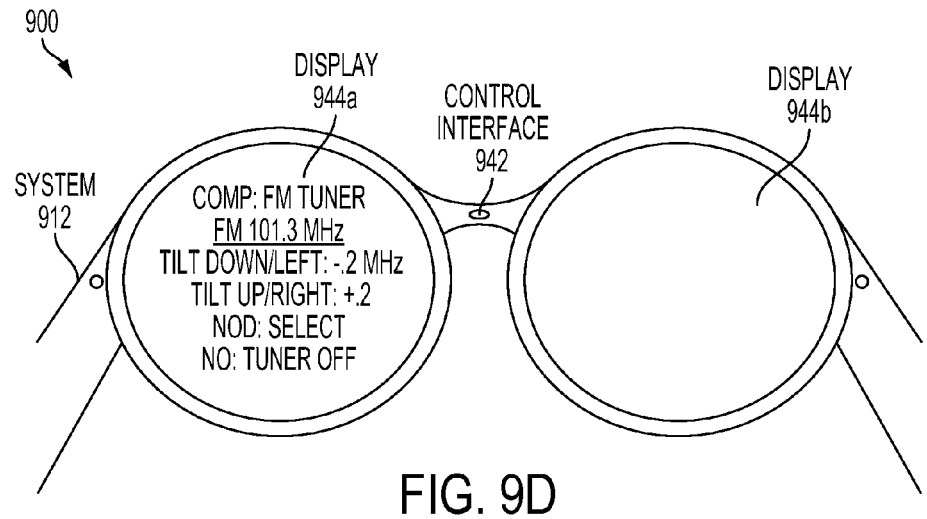

FIG. 9D shows a component-control session of scenario 900 for controlling a component in room 916 using system 912. Display 944a of system 912 instructs wearer 910 that the currently selected component (comp) is an "FM Tuner." In scenario 900, the "FM tuner" is component 934a.

The component displayed in display 944a is the component currently being controlled in the component-control session. To change a selected component, wearer 910 can use a touch pad or other input device to move through a list of components controllable by system 912, or otherwise change the component being displayed in display 944a. In other embodiments, other techniques for selecting a component to be currently controlled can be used, such as discussed above.

Display 944a also shows information and controls about the component being controlled, which in this case is the "FM Tuner." Display 944a shows that the FM tuner is tuned to a frequency of "FM 101.3 MHz" and provides a menu of gestures to control the FM tuner. FIG. 9D shows that these gestures include tilting the head of wearer 910 down or to the left to tune the FM tuner down by 0.2 MHz, titling the head of the wearer 910 up or to the right to tune to the FM tuner up by 0.2 MHz, nodding to select a frequency, and thus end the component control session for the FM tuner, and shaking the head of wearer 910 to turn the FM tuner off. Other techniques, such as discussed above, can be used to provide controls to the FM tuner.

FIG. 9D shows that display 944a includes both information about the component and the menu of actions related to the component displayed on the left-most lens of system 912. In embodiments not shown in FIG. 9D, part of display 944a can be shown in the right-most lens of system 912 as well or instead.

Upon determining that wearer 910 made any gestures or otherwise provided controls for the component-control session, system 912 can decode the gestures or other controls to generate the appropriate control message to the controlled device. For example, if wearer 910 tilted the wearer's head up in response to display 944b, system 912 can then: (a) decode the movement as a "tilt up" gesture, (b) determine that, at the time of the gesture, the tilt up gesture indicates wearer 910 is instructing system 912 to increase the frequency of the FM Tuner by 0.2 MHz, (c) generate a command to component 934a, perhaps via universal remote controller 932, to increase a tuned frequency by 0.2 MHz and (d) update display 944b to show the new frequency of "FM 101.5 MHz". In other embodiments discussed above, system 912 can generate the appropriate control message to the controlled device based on other types of user inputs than head movements.

Figure 9E:
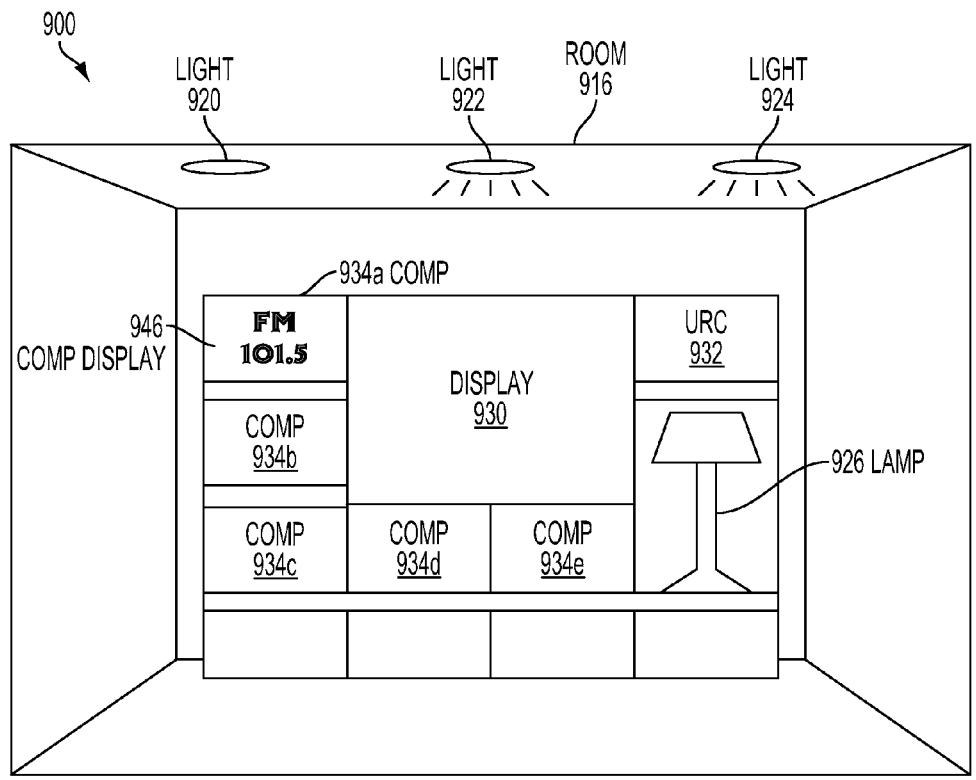

FIG. 9E depicts component 934a, the FM tuner, being activated and tuned to "FM 101.5" as a result of the component-control session discussed above in the context of FIG. 9D. In other scenarios not shown in FIGS. 9A-9G, wearer 910 can change more, different, or other components than component 934a during a component-control session.

Figure 9F:
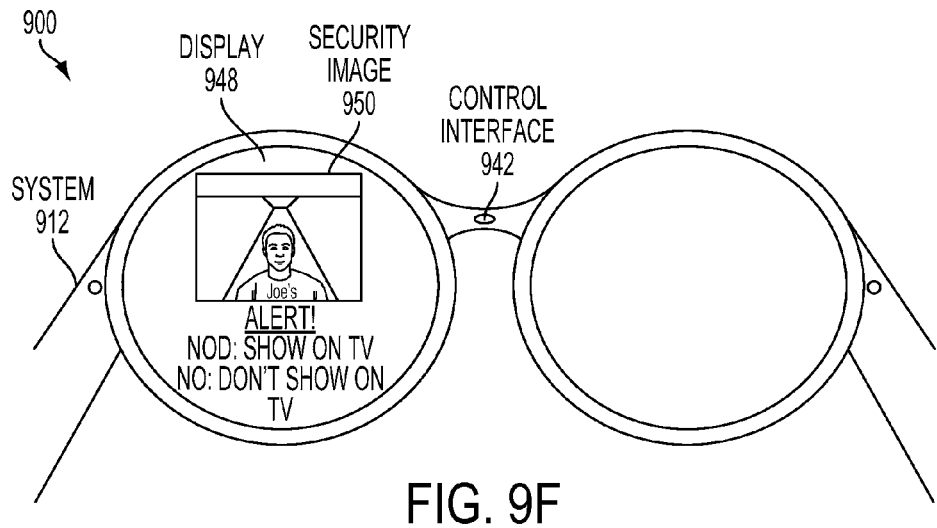
Figure 9G:
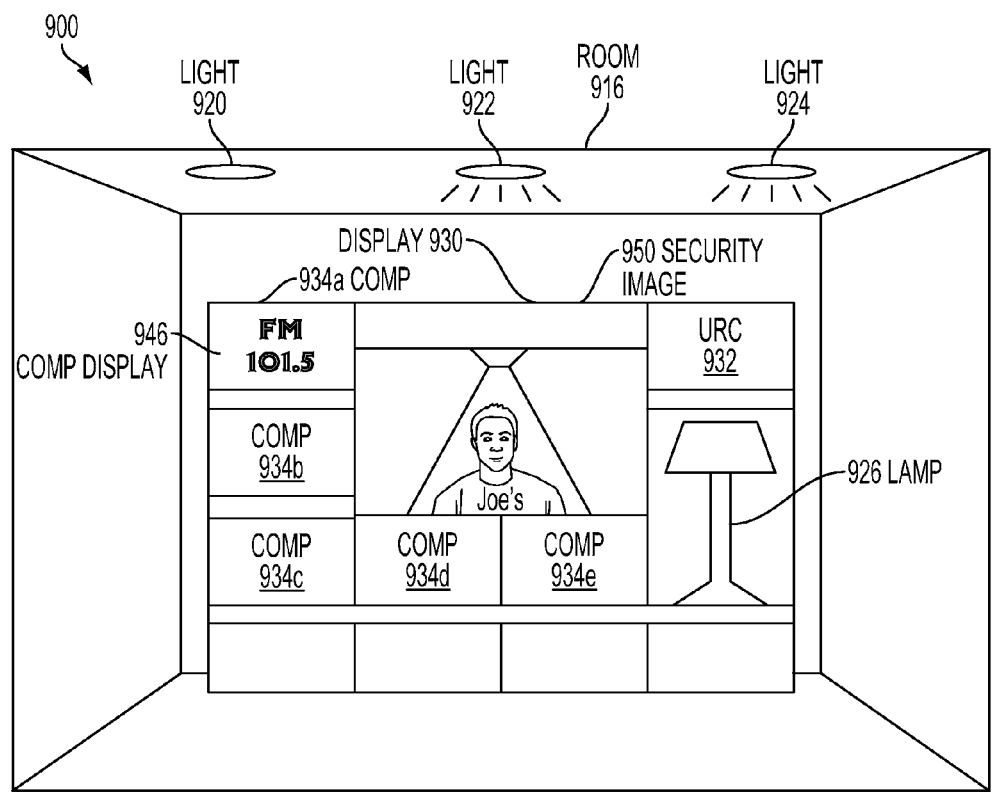

FIG. 9G shows a security session of scenario 900 for controlling a security component outside of room 916 using system 912. System 912 can be used to monitor various security systems that may be inside or outside of room 916, such as video and still cameras, motion detectors, doorbells, entrance intercoms/telephones, lights, and/or other security equipment. In scenario 900, a person has come to the front door of the building containing room 916, which has activated some of the security systems monitored by system 912, including a video camera providing security image 950.

FIG. 9F shows that display 948 of system 912 informs wearer 910 that an alert has been generated by displaying "ALERT!" via display 948. Display 948 also provides instructions on providing controls for security image 950 including instructions to nod for showing security image 950 on a main display (TV) and to shake head as if saying no for removing security image 950 from the main display (TV). FIG. 9F also shows that system 912 has provided security image 950 on display 948 of system 912 for immediate inspection by wearer 910.

With reference to FIG. 9G, in scenario 900, wearer 910 nods to show security image 950 on display 930. Upon determining that wearer 910 nodded, system 912 can decode the gestures or other controls to generate the appropriate control message to the controlled device. After detecting the nod in this example, system 912 can then: (a) determine that, at the time of the gesture, the nod gesture indicates wearer 910 is instructing system 912 to display security image 950 on display 930, and (c) generate one or more commands to display 930 and/or components 934a-934e to display security image 950 on display 930. For example, system 912 can generate a power up command to display 930 and a command to a component, such as a TV tuner or video camera, to route a video feed of the video camera providing security image 950 to display 930. In other embodiments discussed above, system 912 can generate the appropriate control message to the controlled device based on other types of user inputs than head movements.

FIG. 9G depicts display 930 showing security image 950. In other scenarios not shown in FIGS. 9A-9G, wearer 910 can perform other actions during a security session, such as, but not limited to, make or receive telephone calls, activate or deactivate alarms, lights, detectors, and/or other equipment, start and/or stop an audio, video, or audio-video recording, stream audio, video, or audio-video to a remote location, review audio, video, or audio-video from a remote location, and remotely open or close doors, locks, gates, and/or other entrances. In other scenarios than scenario 900, the security alert can be ignored after reviewing the alert and security image 950; for example, security image 950 may be an image of a delivery person from "Joe's" and may not cause wearer 910 concern. Other actions are possible as well during a security session.

Example Operations

Figure 10:
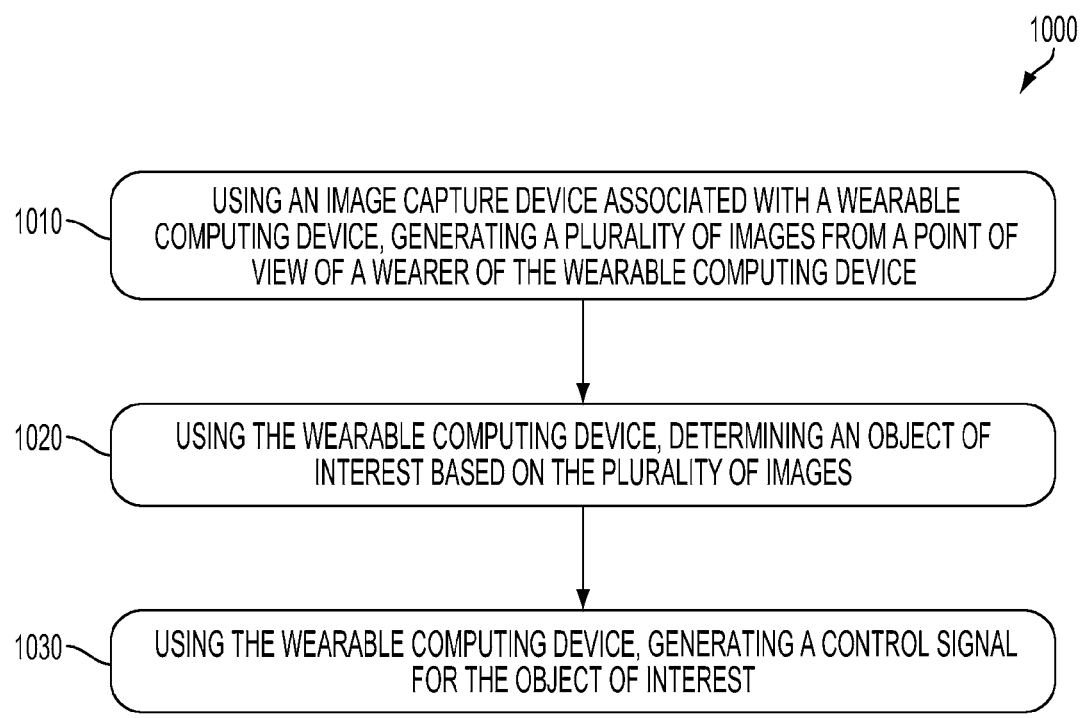
FIG. 10 is a flowchart of an example method, in accordance with an embodiment.

FIG. 10 is a flowchart of an example method 1000, in accordance with an embodiment. At block 1010, a plurality of images can be generated from a point of view of a wearer of a wearable computing device. The plurality of images can be generated using an image capture device associated with the wearable computing device. Generating a plurality of images from a point of view of a wearer of a wearable computing device is discussed above at least in the context of FIGS. 1, 4A, and 6A-8.

At block 1020, an object of interest based on the plurality of images is determined using the wearable computing device. Determining an object of interest based on a plurality of images is discussed above at least in the context of FIGS. 4A and 6A-8.

In some embodiments, determining the object of interest includes recognizing the object of interest in at least one image of the plurality of images. Recognizing object of interests is discussed above at least in the context of FIGS. 4A and 6A-8.

At block 1030, a control signal for the object of interest is generated using the wearable computing device. Generating control signals for objects of interest is discussed above at least in the context of FIGS. 4A-9G.

In some embodiments, the object of interest includes an electronic device and the control signal includes a power-on signal.

In some embodiments, method 1000 further includes transmitting the control signal from the wearable computing device. Transmitting control signals from the wearable computing device is discussed above at least in the context of FIGS. 4A-9G.

In other embodiments, method 1000 further includes: (i) generating a second plurality of images from the point of view of the wearer, (ii) determining that the object of interest is not in at least one image of the second plurality of images, and (iii) in response to determining that the object of interest is not in the at least one image, generating a second control signal for the object of interest. Generating pluralities of images, determining that objects of interest are not in a plurality of images, and generating control signals are discussed above at least in the context of FIGS. 4A and 6A-8.

In further examples of these other embodiments, method 1000 further includes: (iv) determining that the object of interest is in at least one image of the second plurality of images; and (v) generating a third control signal for the object of interest, such as discussed above in the context of at least FIG. 8. In some of these further embodiments, the third control signal includes a volume-control signal, an input-source-control signal, or a combination volume-and-input-source-control signal, such as discussed above at least in the context of FIG. 8.

In some of these other embodiments, the object of interest includes an electronic device, and the second signal includes a power-off signal, such as discussed above at least in the context of at least FIG. 8.

In yet other of these other embodiments, the object of interest includes an electronic device, and the second signal includes a pause signal, such as discussed above at least in the context of at least FIG. 8.

In even other of these other embodiments, determining that the object of interest is not in at least one image of the second plurality of images includes determining that the object of interest is not in at least one image of the second plurality of images for at least a threshold period of time, such as discussed above in the context of at least FIG. 8.

Figure 11:
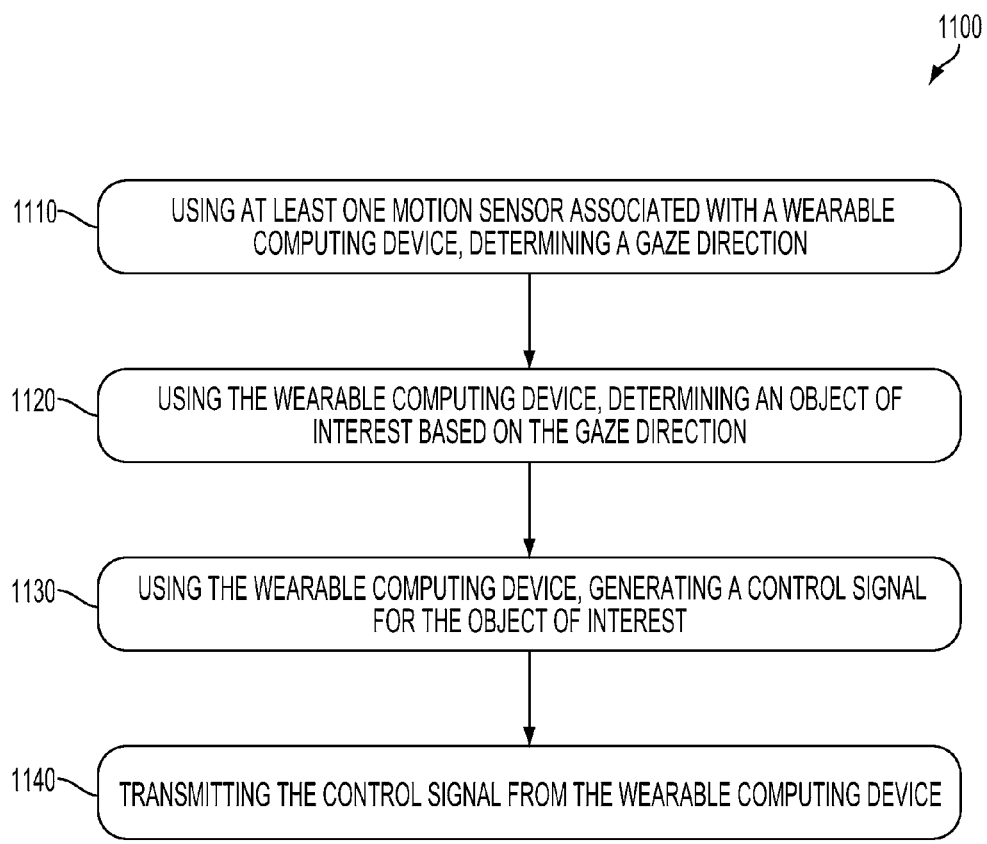
FIG. 11 is a flowchart of another example method, in accordance with an embodiment.

FIG. 11 is a flowchart of an example method 1100, in accordance with an embodiment.

At block 1110, a gaze direction is determined using at least one motion sensor. The motion sensor is associated with a wearable computing device. Determining gaze directions using motion sensors is discussed above in the context of at least FIGS. 4A-5.

At block 1120, an object of interest based on the gaze direction is determined using the wearable computing device. Determining an object of interest based on gaze direction is discussed above in the context of at least FIGS. 4A-5.

At block 1130, a control signal for the object of interest is generated using the wearable computing device. Generating control signals for objects of interest is discussed above in the context of at least FIGS. 4A-9G.

At block 1140, the control signal is transmitted from the wearable computing device, such as discussed above in the context of at least FIGS. 4A-9G.

In other embodiments, method 1100 further includes: determining a location of the wearable computing device using the at least one motion sensor. In these embodiments, generating the control signal can include generating the control signal based on the location. Determining an object of interest based on location is discussed above in the context of at least FIGS. 4A-5.

In some embodiments, generating the control signal based on the location can include: (i) determining whether the location is within a threshold distance of the object of interest; (ii) in response to determining that the location is within the threshold distance, generating a first control signal; and (iii) in response to determining that the location is not within the threshold distance, generating a second control signal, wherein the first control signal differs from the second control signal. Determining control signals based on locations being within or outside of threshold distances is discussed above in the context of at least FIGS. 5 and 8.

In more particular of these other embodiments, the object of interest can include an electronic object, the first control signal can include a pause signal, and the second control signal can include a power-off signal.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
    using an image capture device associated with a wearable computing device, capturing a first image from a point of view of a wearer of the wearable computing device;
    using the wearable computing device, determining a device of interest based on the first image;
    using the wearable computing device, generating a first control signal for the device of interest to (i) begin playback of media content, (ii) resume playback of media content, or (iii) power on;
    capturing a second image from the point of view of the wearer;
    determining that the device of interest is not in the second image; and
    in response to determining that the device of interest is not in the second image, generating a second control signal for the device of interest to (i) pause playback of media content or (ii) power off.

2. The method of claim 1, further comprising transmitting the first control signal and the second control signal from the wearable computing device.

3. The method of claim 1, wherein the first control signal comprises a signal for the device of interest to power on.

4. The method of claim 1, wherein determining the device of interest comprises: recognizing the device of interest in the first image.

5. The method of claim 1, wherein the second control signal comprises a signal for the device of interest to power off.

6. The method of claim 1, wherein the first control signal comprises a signal for the device of interest to begin playback of media content.

7. The method of claim 1,
    further comprising capturing a plurality of images over a period of time, wherein the plurality of images includes the second image,
    wherein the second control signal is generated in response to determining that the device of interest is not in any image of the plurality of images.

8. The method of claim 1, further comprising:
    capturing a plurality of images over a period of time;
    determining that the device of interest is in at least one image of the plurality of images; and
    based on determining that the device of interest is in at least one image of the plurality of images, generating a third control signal for the device of interest.

9. The method of claim 8, wherein the third control signal comprises a volume-control signal, an input-source-control signal, or a combination volume-and-input-source-control signal.

10. The method of claim 1, wherein the device of interest comprises:
    a display device; and
    a control device, wherein the control device is configured to receive the first and second control signals and control the display device based on receiving the first and second control signals.

11. A wearable computing device, comprising:
    an image capture device;
    a processor; and
    memory having instructions that, in response to execution by the processor, cause the wearable computing device to perform functions comprising:
        the image capture device capturing a first image from a point of view of a wearer of the wearable computing device;
        determining a device of interest based on the first image;
        generating a first control signal for the device of interest to (i) begin playback of media content, (ii) resume playback of media content, or (iii) power on;
        capturing a second image from the point of view of the wearer;
        determining that the device of interest is not in the second image; and
        in response to determining that the device of interest is not in the second image, generating a second control signal for the device of interest to (i) pause playback of media content or (ii) power off.

12. The wearable computing device of claim 11, further comprising a command interface, wherein the functions further comprise transmitting the first control signal and the second control signal using the command interface.

13. The wearable computing device of claim 11, wherein the first control signal comprises a signal for the device of interest to power on.

14. The wearable computing device of claim 11, wherein determining the device of interest comprises: recognizing the device of interest in the first image.

15. The wearable computing device of claim 11, wherein the second control signal comprises a signal for the device of interest to power off.

16. The wearable computing device of claim 11, wherein the first control signal comprises a signal for the device of interest to begin playback of media content.

17. The wearable computing device of claim 11,
    wherein the functions further comprise capturing a plurality of images over a period of time, wherein the plurality of images includes the second image, and
    wherein the second control signal is generated in response to determining that the device of interest is not in any image of the plurality of images.

18. The wearable computing device of claim 11, wherein the functions further comprise:
    capturing a plurality of images over a period of time;
    determining that the device of interest is in at least one image of the plurality of images; and
    based on determining that the device of interest is in at least one image of the plurality of images, generating a third control signal for the device of interest.

19. The wearable computing device of claim 18, wherein the third control signal comprises a volume-control signal, an input-source-control signal, or a combination volume-and-input-source-control signal.

20. The wearable computing device of claim 11, wherein the device of interest comprises:
- a display device; and
- a control device, wherein the control device is configured to receive the first and second control signals and control the display device based on receiving the first and second control signals.

21. A non-transitory computer-readable storage medium having instructions stored thereon that, in response to execution by a wearable computing device, cause the wearable computing device to perform functions, the instructions comprising:
- instructions for capturing a first image from a point of view of a wearer of the wearable computing device;
- instructions for determining a device of interest based on the first image;
- instructions for generating a first control signal for the device of interest to (i) begin playback of media content, (ii) resume playback of media content, or (iii) power on;
- instructions for capturing a second image from the point of view of the wearer;
- instructions for determining that the device of interest is not in the second image; and
- instructions for, in response to determining that the device of interest is not in the second image, generating a second control signal for the device of interest to (i) pause playback of media content or (ii) power off.

22. The non-transitory computer-readable storage medium of claim 21, the instructions further comprising instructions for transmitting the first control signal and the second control signal.

23. The non-transitory computer-readable storage medium of claim 21, wherein the first control signal comprises a signal for the device of interest to power on.

24. The non-transitory computer-readable storage medium of claim 21, wherein the instructions for determining the device of interest comprise: instructions for recognizing the device of interest in the first image.

25. The non-transitory computer-readable storage medium of claim 21, wherein the second control signal comprises a signal for the device of interest to power off.

26. The non-transitory computer-readable storage medium of claim 21, wherein the first control signal comprises a signal for the device of interest to begin playback of media content.

27. The non-transitory computer-readable storage medium of claim 21,
- wherein the instructions further comprise instructions for capturing a plurality of images over a period of time, wherein the plurality of images includes the second image, and
- wherein the second control signal is generated in response to determining that the device of interest is not in any image of the plurality of images.

28. The non-transitory computer-readable storage medium of claim 21, wherein the instructions further comprise:
- instructions for capturing a plurality of images over a period of time,
- instructions for determining that the device of interest is in at least one image of the plurality of images; and
- instructions for, based on determining that the device of interest is in at least one image of the plurality of images, generating a third control signal for the device of interest.

29. The non-transitory computer-readable storage medium of claim 28, wherein the third control signal comprises a volume-control signal, an input-source-control signal, or a combination volume-and-input-source-control signal.

30. The non-transitory computer-readable storage medium of claim 21, wherein the device of interest comprises:
- a display device; and
- a control device, wherein the control device is configured to receive the first and second control signals and control the display device based on receiving the first and second control signals.

* * * * *